(12) United States Patent
Qi et al.

(10) Patent No.: US 8,831,121 B1
(45) Date of Patent: Sep. 9, 2014

(54) MULTICARRIER CHANNELIZATION AND DEMODULATION APPARATUS AND METHOD

(75) Inventors: Ronggang Qi, Ashburn, VA (US); Baoyan Ding, Potomac, MD (US); Paul Wayner, Fairfax, VA (US)

(73) Assignee: VT Idirect, Inc., Herndon, VA (US)

( * ) Notice: Subject to any disclaimer, the term of this patent is extended or adjusted under 35 U.S.C. 154(b) by 140 days.

(21) Appl. No.: 13/492,684

(22) Filed: Jun. 8, 2012

(51) Int. Cl.
*H04K 1/10* (2006.01)
*H04L 27/28* (2006.01)

(52) U.S. Cl.
USPC ......................................................... 375/260

(58) Field of Classification Search
CPC ............ H04L 67/1002; H04L 67/1097; H04L 67/1008; H04L 67/101; H04L 709/221; H04L 709/219; H04L 709/223; G06F 15/16; G06F 15/173
USPC .......... 375/148, 214, 219; 370/219, 347, 343, 370/204, 252
See application file for complete search history.

(56) References Cited

U.S. PATENT DOCUMENTS

| | | | | |
|---|---|---|---|---|
| 5,535,240 A | * | 7/1996 | Carney et al. | 375/219 |
| 6,459,703 B1 | * | 10/2002 | Grimwood et al. | 370/442 |
| 2013/0077500 A1 | * | 3/2013 | Hutchison et al. | 370/252 |

* cited by examiner

*Primary Examiner* — Chieh M Fan
*Assistant Examiner* — Wednel Cadeau
(74) *Attorney, Agent, or Firm* — Oblon, Spivak, McClelland, Maier & Neustadt, L.L.P.

(57) ABSTRACT

A method of decoding a digitally encoded signal having plural channels includes sampling a transient portion of a master filter mask, storing matched filter coefficients obtained from the sampling, receiving the digitally encoded signal, channelizing the digitally encoded signal into the plural channels, and generating a channel matched filter mask for each one of the plural channels using a subset of the stored coefficients. The method also includes filtering each one of the plural channels, in the frequency domain, based on the channel matched filter mask generated for each of the plural channels. Also disclosed are related methods using a burst reconstruction buffer, per channel distortion equalization, channel estimation and activity monitoring, and noise floor estimation, as well as corresponding apparatuses.

14 Claims, 35 Drawing Sheets

| Fadc | | | | | 94 | MHz | | | |
|---|---|---|---|---|---|---|---|---|---|
| Fs_fft | | | | | 47 | MHz | | | |
| Nfft | | | | | 16384 | | | | |
| Overlap Ratio | | | | | 0.25 | | | | |
| Max. IFFT Input/Output Sample Rate | | | | | 2.8 | s.p.s | | | |
| Channelizer Output Rate (Spread Spectrum) | | | | | 4 | s.p.s | | | |
| Channelizer Output Rate (B/Q/8-PSK) | | | | | 2 | s.p.s | | | |
| Freq. Resolution of FFT | | | | | 2868.652 | Hz/bin | | | |
| fc (Hz) | Rs or Rc (Ksym) | Waveform | bins/Rs bins/Rc | Nifft | IFFT samp Rate | Interp. Ratio | Channel Center | IFFT Center | Freq. Error |
| 30404733 | 64.000 | B/Q/8PSK | 22.31 | 32 | 1.434326 | 1.394383 | 10598.96 | 10599 | -0.001769 |
| | | SS | 22.31 | 32 | 1.434326 | 2.788766 | 10598.96 | 10599 | -0.001769 |
| 10000000 | 96.000 | B/Q/8PSK | 33.47 | 64 | 1.912435 | 1.045787 | 3485.96 | 3486 | -0.001272 |
| | | SS | 33.47 | 64 | 1.912435 | 2.091574 | 3485.96 | 3486 | -0.001272 |
| 3000000 | 128.000 | B/Q/8PSK | 44.62 | 64 | 1.434326 | 1.394383 | 1045.79 | 1046 | -0.004768 |
| | | SS | 44.62 | 64 | 1.434326 | 2.788766 | 1045.79 | 1046 | -0.004768 |
| 25000000 | 182.000 | B/Q/8PSK | 63.44 | 128 | 2.017514 | 0.991319 | 8714.89 | 8715 | -0.001677 |
| | | SS | 63.44 | 128 | 2.017514 | 1.982638 | 8714.89 | 8715 | -0.001677 |
| 35000000 | 512.000 | B/Q/8PSK | 178.48 | 256 | 1.434326 | 1.394383 | 12200.85 | 12201 | -0.000834 |
| | | SS | 178.48 | 256 | 1.434326 | 2.788766 | 12200.85 | 12201 | -0.000834 |
| 39342330 | 1024.000 | B/Q/8PSK | 356.96 | 512 | 1.434326 | 1.394383 | 13714.57 | 13715 | -0.001208 |
| | | SS | 356.96 | 512 | 1.434326 | 2.788766 | 13714.57 | 13715 | -0.001208 |
| 15000000 | 2048.000 | B/Q/8PSK | 713.92 | 1024 | 1.434326 | 1.394383 | 5228.94 | 5229 | -0.000089 |
| | | SS | 713.92 | 1024 | 1.434326 | 2.788766 | 5228.94 | 5229 | -0.000089 |
| 23500000 | 2916.667 | B/Q/8PSK | 1016.74 | 2048 | 2.014286 | 0.992908 | 8192.00 | 8192 | 0.000000 |
| | | SS | 1016.74 | 2048 | 2.014286 | 1.985816 | 8192.00 | 8192 | 0.000000 |
| 2000000 | 4096.000 | B/Q/8PSK | 1427.85 | 2048 | 1.434326 | 1.394383 | 697.19 | 697 | 0.000134 |
| | | SS | 1427.85 | 2048 | 1.434326 | 2.788766 | 697.19 | 697 | 0.000134 |
| 5000000 | 6400.000 | B/Q/8PSK | 2231.01 | 4096 | 1.835938 | 1.089362 | 1742.98 | 1743 | -0.000010 |
| | | SS | 2231.01 | 4096 | 1.835938 | 2.178723 | 1742.98 | 1743 | -0.000010 |
| 8000000 | 7500.000 | B/Q/8PSK | 2614.47 | 4096 | 1.566667 | 1.276596 | 2788.77 | 2789 | -0.000090 |
| | | SS | 2614.47 | 4096 | 1.566667 | 2.553191 | 2788.77 | 2789 | -0.000090 |
| 23500000 | 8350.000 | B/Q/8PSK | 2910.77 | 4096 | 1.407186 | 1.421277 | 8192.00 | 8192 | 0.000000 |
| | | SS | 2910.77 | 4096 | 1.407186 | 2.842553 | 8192.00 | 8192 | 0.000000 |

Figure 7

| c2 | | c1 | | Out0 | Out1 |
|---|---|---|---|---|---|
| 0 | 0 | ∅ | ∅ | In1 | In3 |
| 1 | 0 | 0 | 0 | In1 | In3 |
| 1 | 0 | 0 | 1 | In0 | In2 |
| 1 | 0 | 1 | 0 | In1 | In3 |
| 1 | 0 | 1 | 1 | In0 | In2 |
| 0 | 1 | 0 | 0 | In1 | In3 |
| 0 | 1 | 0 | 1 | In2 | In1 |
| 0 | 1 | 1 | 0 | In0 | In2 |
| 0 | 1 | 1 | 1 | In3 | In0 |
| 1 | 1 | 0 | 0 | In1 | In3 |
| 1 | 1 | 0 | 1 | In3 | In0 |
| 1 | 1 | 1 | 0 | In0 | In2 |
| 1 | 1 | 1 | 1 | In2 | In1 |

Figure 11

% Long-Division Algorithm
% It performs division between two signed integers.
% The absolute value of the denominator must be greater or equal to that of the numerator
%
% Usage:
% result      = fxpt_longdiv(num,den,Nb)
% num         - numerator (signed integer)
% den         - denominator (signed integer)
% result      - division result (signed integer)
%               (floating-point result = div_result/2^(Nb-1)
% Nb          - # of bit of the division result
%

*function result = fxpt_longdiv(num,den,Nb)*
sgn=sign(num).*sign(den);
num=abs(num);
den=abs(den);
result=0;
*for i=1:Nb-1*
   result=result*2;
   num=2*num;
   result=result+(den <= num);
   num=num-den.*(den <= num);
*end;*
result=sgn.*result;
return

Figure 18 input vector

| n    | 0   | 1   | 2   | 3   | 4   | 5   | 6   | 7   | 8   | 9   | 10  | 11  | 12  | 13  | 14  | 15  | 16  | 17  | 18  | 19  | 20  | 21  | 22  | 23  | 24  |
|------|-----|-----|-----|-----|-----|-----|-----|-----|-----|-----|-----|-----|-----|-----|-----|-----|-----|-----|-----|-----|-----|-----|-----|-----|-----|
| x(n) | -14 | -53 | 4   | 9   | -37 | 38  | 38  | -1  | 10  | 6   | -6  | 23  | -19 | 70  | -4  | 4   | 34  | 2   | -3  | -27 | 9   | -43 | 23  | 52  | 24  |

| n    | 25  | 26  | 27  | 28  | 29  | 30  | 31  | 32  | 33  | 34  | 35  | 36  | 37  | 38  | 39  | 40  | 41  | 42  | 43  | 44  | 45  | 46  | 47  | 48  | 49  |
|------|-----|-----|-----|-----|-----|-----|-----|-----|-----|-----|-----|-----|-----|-----|-----|-----|-----|-----|-----|-----|-----|-----|-----|-----|-----|
| x(n) | 25  | 26  | 27  | 28  | 29  | 30  | 31  | 32  | 33  | 34  | 35  | 36  | 37  | 38  | 39  | 40  | 41  | 42  | 43  | 44  | 45  | 46  | 47  | 48  | 49  |
| x(n) | 27  | 40  | -51 | -46 | 18  | -13 | 22  | 26  | 23  | 41  | 21  | 38  | -38 | -1  | -5  | -51 | 8   | -34 | 45  | -26 | 17  | 7   | -30 | -69 | -2  | output vector

| m    | 0   | 1   | 2   | 3   | 4   | 5   | 6   | 7   | 8   | 9   | 10  | 11  | 12  | 13  | 14  | 15  | 16  | 17  | 18  | 19  | 20  | 21  | 22  | 23  | 24  |
|------|-----|-----|-----|-----|-----|-----|-----|-----|-----|-----|-----|-----|-----|-----|-----|-----|-----|-----|-----|-----|-----|-----|-----|-----|-----|
| y(m) | 0   | 0   | 0   | -7  | -33 | -53 | -35 | 4   | 19  | -2  | -32 | -21 | 24  | 51  | 38  | 14  | -2  | 2   | 11  | 7   | -4  | -6  | 13  | 13  | -14 |

| m    | 25  | 26  | 27  | 28  | 29  | 30  | 31  | 32  | 33  | 34  | 35  | 36  | 37  | 38  | 39  | 40  | 41  | 42  | 43  | 44  | 45  | 46  | 47  | 48  | 49  |
|------|-----|-----|-----|-----|-----|-----|-----|-----|-----|-----|-----|-----|-----|-----|-----|-----|-----|-----|-----|-----|-----|-----|-----|-----|-----|
| y(m) | 9   | 58  | 48  | -4  | -13 | 10  | 29  | 28  | 8   | -2  | -3  | -22 | -21 | 1   | -9  | -38 | -25 | 23  | 56  | 40  | -3  | -18 | 14  | 48  | 49  |

| m    | 50  | 51  | 52  | 53  | 54  | 55  | 56  | 57  | 58  | 59  | 60  | 61  | 62  | 63  | 64  | 65  | 66  | 67  | 68  | 69  | 70  | 71  | 72  | 73  | 74  |
|------|-----|-----|-----|-----|-----|-----|-----|-----|-----|-----|-----|-----|-----|-----|-----|-----|-----|-----|-----|-----|-----|-----|-----|-----|-----|
| y(m) | 50  | 51  | 52  | 53  | 54  | 55  | 57  | 2   | 58  | 59  | 60  | 61  | 62  | 63  | 64  | 65  | 66  | 67  | 68  | 69  | 70  | 71  | 72  | 73  | 74  |
| y(m) | -12 | -60 | -64 | -25 | 10  | 8   | -13 | 2   | 24  | 28  | 23  | 22  | 32  | 41  | 29  | 26  | 38  | 14  | -29 | -32 | -1  | 6   | -16 | -45 | -35 |

| m    | 75  | 76  | 77  | 78  | 79  | 80  | 81  | 82  | 83  | 84  | 85  | 86  | 87  | 88  | 89  | 90  | 91  | 92  | 93  | 94  | 95  | 96  | 97  | 98  | 99  |
|------|-----|-----|-----|-----|-----|-----|-----|-----|-----|-----|-----|-----|-----|-----|-----|-----|-----|-----|-----|-----|-----|-----|-----|-----|-----|
| y(m) | 75  | 76  | 77  | 78  | 79  | 80  | 81  | 82  | 83  | 84  | 85  | 86  | 87  | 88  | 89  | 90  | 91  | 92  | 93  | 94  | 95  | 96  | 97  | 98  | 99  |
| y(m) | -1  | -13 | -34 | 14  | 37  | -3  | -21 | 6   | 22  | 7   | -11 | -42 | -69 | -55 | -15 | 6   | 0   |     |     |     |     |     |     |     |     |

Figure 20

| step-up | step-down | stepping value | stepping |
|---|---|---|---|
| 0 | 0 | 0 | 0 (F) |
| 0 | 1 | -1 | 1 (T) |
| 1 | 0 | 1 | 1 (T) |
| 1 | 1 | 1 | 1 (T) |

Figure 28A

| stepping history | | | | |
|---|---|---|---|---|
| k-3 | k-2 | k-1 | k | state |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

Figure 28B

MULTICARRIER CHANNELIZATION AND DEMODULATION APPARATUS AND METHOD

BACKGROUND

1. Field of the Disclosure

Embodiments described herein relate generally to a multi-carrier channelization and demodulation technology for multi-frequency time division multiple access (MF-TDMA) communication systems in general and satellite communication systems in particular.

2. Description of the Related Art

A conventional MF-TDMA system may use an inefficient homogenous bandwidth-time plans where all frequency channels (carriers) have the same modulation and coding scheme (MODCOD) and symbol rate. Conventional systems may be designed to handle a worst case link with rain fading such that remotes in clear sky are severely penalized (i.e., having too much margins to close the link). A conventional MF-TDMA system may include multiple analog chains and analog-to-digital converters (ADC) to perform multi-carrier channelization in the time domain.

SUMMARY

Accordingly, an object of the present disclosure is to provide a novel method of decoding a digitally encoded signal having plural channels. The method includes calculating and storing master matched filter coefficients representing only one side of a transient portion of a filter, receiving the digitally encoded signal, channelizing the digitally encoded signal into the plural channels, obtaining a channel matched filter mask for each of the plural channels from the stored master matched filter coefficients, and filtering each of the plural channels, in the frequency domain, based on the channel matched filter mask for each of the plural channels.

Another object of the present disclosure is to provide a novel signal channelizing and filtering apparatus. The apparatus includes a processor configured to calculate master matched filter coefficients representing only one side of a transient portion of a filter, a memory configured to store the calculated master matched filter coefficients representing only one side of a transient portion of a filter, a signal channelizer device configured to receive and demultiplex a digitally encoded multichannel signal into a plural channelized signals, a fast Fourier transform device configured to convert each of the plural channelized signals from the time domain to the frequency domain; a channel matched filter obtaining section that obtains a channel matched filter mask for each of the plural channels from the stored master matched filter coefficients; and a filter that filters the channelized signal using the obtained channel matched filter mask for each of the plural channels.

Another object of the present disclosure is to provide a novel non-transitory computer-readable storage medium having a computer-readable program stored therein that when executed by a computer causes the computer to perform a method. The method includes calculating and storing master matched filter coefficients representing only one side of a transient portion of a filter, receiving the digitally encoded signal, channelizing the digitally encoded signal into the plural channels, obtaining a channel matched filter mask for each of the plural channels from the stored master matched filter coefficients, and filtering each of the plural channels, in the frequency domain, based on the channel matched filter mask for each of the plural channels.

Another object of the present disclosure is to provide a novel method of decoding a digitally encoded signal having plural channels. The method includes receiving the digitally encoded signal from a frequency domain channelizer as a plurality of bursts in each channel, each burst in each channel including a plurality of data blocks from a corresponding channel, buffering each of the plural channels of the received digitally encoded signal in a burst reconstruction buffer, the burst reconstruction buffer including an independent channel buffer for each of the plural channels, selecting one of the independent channel buffers, outputting, as a complete burst, the plurality of data blocks from the selected one of the independent channel buffers to a demodulator, and demodulating the complete burst of the digitally encoded signal at the demodulator.

Another object of the present disclosure is to provide a novel apparatus for decoding a digitally encoded signal having plural channels. The apparatus includes a frequency domain channelizer configured to output a plurality of bursts in each channel of the digitally encoded signal, each burst in each channel including a plurality of data blocks from a corresponding channel, a burst reconstruction buffer configured to buffer each of the plural channels of the received digitally encoded signal in a burst reconstruction buffer, the burst reconstruction buffer including an independent channel buffer for each of the plural channels, a selector configured to select one of the independent channel buffers, the burst reconstruction buffer is further configured to output, as a complete burst, the plurality of data blocks from the selected one of the independent channel buffers, and a demodulator configured to demodulate the complete burst of the digitally encoded signal.

Another object of the present disclosure is to provide a novel non-transitory computer-readable storage medium having a computer-readable program stored therein that when executed by a computer causes the computer to perform a method. The method includes receiving the digitally encoded signal from a frequency domain channelizer as a plurality of bursts in each channel, each burst in each channel including a plurality of data blocks from a corresponding channel, buffering each of the plural channels of the received digitally encoded signal in a burst reconstruction buffer, the burst reconstruction buffer including an independent channel buffer for each of the plural channels, selecting one of the independent channel buffers, outputting, as a complete burst, the plurality of data blocks from the selected one of the independent channel buffers to a demodulator, and demodulating the complete burst of the digitally encoded signal at the demodulator.

Another object of the present disclosure is to provide a novel method of equalizing a digitally encoded signal having plural channels. The method includes receiving a group delay profile and a gain flatness profile for each of the plural channels of the digitally encoded signal, calculating a different set of equalization coefficients for each of the plural channels based on the received group delay profiles and gain flatness profiles, storing the different set of equalization coefficients for each of the plural channels, and equalizing, in the frequency domain, each of the plural channels in the digitally encoded signal by applying a corresponding one of the different sets of equalization coefficients.

Another object of the present disclosure is to provide a novel apparatus that equalizes a digitally encoded signal having plural channels. The apparatus includes a receiver configured to receive a group delay profile and a gain flatness profile for each of the plural channels of the digitally encoded signal, a calculation device configured to calculate a different set of equalization coefficients for each of the plural channels based on the received group delay profiles and gain flatness profiles, a memory configured to store the different set of equalization coefficients for each of the plural channels, and a processor configured to equalize, in the frequency domain, each of the plural channels in the digitally encoded signal by applying a corresponding one of the different sets of equalization coefficients.

Another object of the present disclosure is to provide a novel non-transitory computer-readable storage medium having a computer-readable program stored therein that when executed by a computer causes the computer to perform a method. The method includes receiving a group delay profile and a gain flatness profile for each of the plural channels of the digitally encoded signal, calculating a different set of equalization coefficients for each of the plural channels based on the received group delay profiles and gain flatness profiles, storing the different set of equalization coefficients for each of the plural channels, and equalizing, in the frequency domain, each of the plural channels in the digitally encoded signal by applying a corresponding one of the different sets of equalization coefficients.

Another object of the present disclosure is to provide a novel method of decoding a digitally encoded signal having plural channels. The method includes receiving the digitally encoded signal according to a channel gain value, sampling the received digitally encoded signal, determining an overflow condition exists based on a relationship between at least one sampled value in the sampled received digitally encoded signal and a sample overflow threshold, and varying the channel gain value based on the determined overflow condition.

Another object of the present disclosure is to provide a novel decoding apparatus that decodes a digitally encoded signal having plural channels. The apparatus includes a sampling device configured to receive the digitally encoded signal according to a channel gain value and output sampled values, a processor configured to determine an overflow condition exists based on a relationship between at least one sampled value and a sample overflow threshold, and a controller configured to vary the channel gain based on the overflow condition.

Another object of the present disclosure is to provide a novel non-transitory computer-readable storage medium having a computer-readable program stored therein that when executed by a computer causes the computer to perform a method. The method includes receiving the digitally encoded signal according to a channel gain value, sampling the received digitally encoded signal, determining an overflow condition exists based on a relationship between at least one sampled value in the sampled received digitally encoded signal and a sample overflow threshold, and varying the channel gain value based on the determined overflow condition.

Another object of the present disclosure is to provide a novel method of decoding a digitally encoded signal having plural channels. The method includes receiving the digitally encoded signal according to a channel gain value, sampling the received digitally encoded signal, determining an underflow condition exists based on a relationship between at least one sampled value in the sampled received digitally encoded signal and a sample underflow threshold, and varying the channel gain value based on the determined underflow condition.

Another object of the present disclosure is to provide a novel decoding apparatus that decodes a digitally encoded signal having plural channels. The apparatus includes a sampling device configured to receive the digitally encoded signal according to a channel gain value and output sampled values, a processor configured to determine an underflow condition exists based on a relationship between at least one sampled value and a sample underflow threshold, and a controller configured to vary the channel gain based on the determined underflow condition.

Another object of the present disclosure is to provide a novel non-transitory computer-readable storage medium having a computer-readable program stored therein that when executed by a computer causes the computer to perform a method. The method includes receiving the digitally encoded signal according to a channel gain value, sampling the received digitally encoded signal, determining an underflow condition exists based on a relationship between at least one sampled value in the sampled received digitally encoded signal and a sample underflow threshold, and varying the channel gain value based on the determined underflow condition.

Another object of the present disclosure is to provide a novel method of noise flow estimation of a digitally encoded signal having plural channels. The method includes sampling, in the frequency domain, a plurality of blocks in the digitally encoded signal having plural channels, calculating a moving average of a power spectral density based on the sampling, generating a histogram of the moving average, estimating the noise floor of the digitally encoded signal based on an index of a lowest local maximum of the generated histogram, and varying a channel gain value based on the estimated noise floor.

Another object of the present disclosure is to provide a novel noise floor estimation apparatus for a digitally encoded signal having plural channels. The apparatus includes a sampling device configured to sample, in the frequency domain, a plurality of blocks in the digitally encoded signal having plural channels, a processor configured to calculate a moving average of a power spectral density based on the sampling, generate a histogram of the moving average, and estimate the noise floor of the digitally encoded signal based on an index of a lowest local maximum of the generated histogram, and a gain control device configured to vary a channel gain value based on the estimated noise floor.

Another object of the present disclosure is to provide a novel non-transitory computer-readable storage medium having a computer-readable program stored therein that when executed by a computer causes the computer to perform a method. The method includes sampling, in the frequency domain, a plurality of blocks in the digitally encoded signal having plural channels, calculating a moving average of a power spectral density based on the sampling, generating a histogram of the moving average, estimating the noise floor of the digitally encoded signal based on an index of a lowest local maximum of the generated histogram, and varying a channel gain value based on the estimated noise floor.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and the exemplary depictions do not in any way limit the scope of the advancements embraced by the specification. The scope of the advancements embraced by the specification and drawings are defined by the words of the accompanying claims.

FIG. 7 is a table of channelizer parameter settings according to an exemplary embodiment.

FIG. 11 is a truth table of a selection of control signals for the block phase rotator according to an exemplary embodiment.

FIG. 18 is Matlab code implementing a long division divider structure according to an exemplary embodiment.

FIG. 20 is table showing the results of a short test vector produced by the single clock Farrow rate converter according to an exemplary embodiment.

FIGS. 28A and 28B illustrates an instantaneous stepping state and a stepping state definition of an overflow/underflow based initial gain setting method according to an exemplary embodiment.

DETAILED DESCRIPTION OF THE EMBODIMENTS

Figure 1:
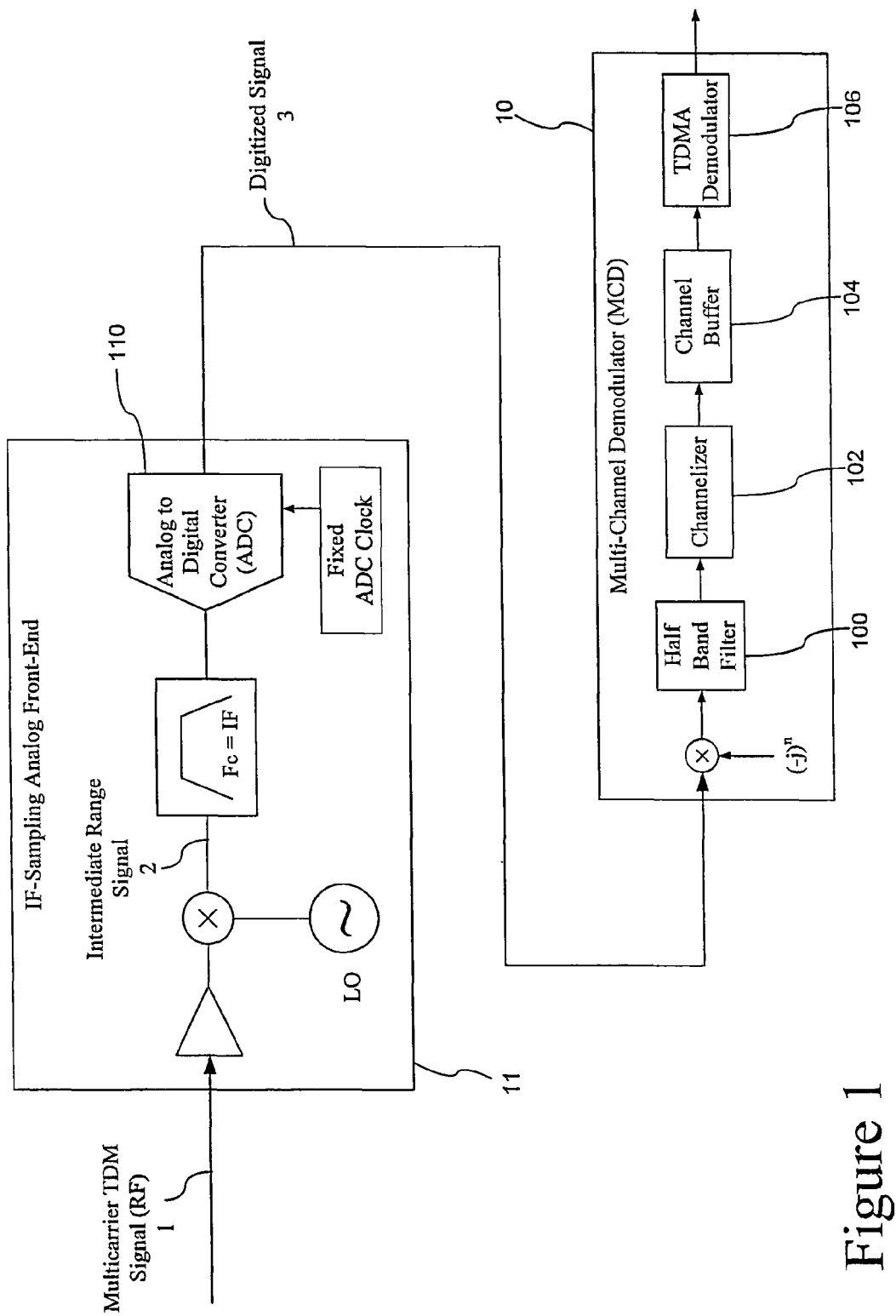
FIG. 1 is a block diagram of a multi-channel demodulator apparatus according to an exemplary embodiment.

Referring now to the drawings, wherein like reference numerals designate identical or corresponding parts throughout the several views, FIG. 1 shows a block diagram of a satellite communication system according to an embodiment of the invention. Multi-carrier TDMA signals, generated from transmission sources such as remote user terminals at different geographical locations, are propagated, via a satellite transmission, to a central hub, including an FDC, where the received signals are processed. Once a signal is received at the hub, the signal undergoes intermediate frequency (IF) downconversion and sampling prior to being sent to a channelizer for filtering and processing.

In an adaptive TDMA system according to an embodiment of the invention, a remote may be allocated with bandwidth according to its channel condition (whether it is experiencing rain fade or in clear sky). For instance, if it is in clear sky, it may transmit with high MODCOD at high symbol rate (e.g., in 8PSK with high FEC rate and symbol rate) to achieve the highest possible spectral efficiency and throughput. In the other extreme, if a remote communicating according to an embodiment of the invention experiences rain fade, the remote may transmit with a highly protected carrier (i.e., low MODCOD at low symbol rate and low FEC rate like BPSK code rate ½, etc.). Therefore, the Adaptive TDMA (ATDMA) system according to an embodiment of the invention can adaptively adjust MODCOD and symbol rate of each remote according to its channel condition without sacrificing spectral efficiency and throughput of remotes in clear sky. Also, an embodiment of the present invention may include a Frequency Domain Channelizer (FDC) to channelize any frequency plan and symbol rate as required by a heterogeneous bandwidth-time plan in an ATDMA systems.

Embodiments of the present invention process and/or condition digital multifrequency carrier signals using frequency domain channelization. Embodiments of the invention include processing techniques for frequency channel and burst signals that may result in advantageously efficient and low-complexity implementation of matched filtering in the frequency domain, efficient frequency-domain equalization of linear distortion introduced by transmitting and/or receiving analog/RF chains, and fast per channel initial gain setting of a Multicarrier Demodulator (MCD). Embodiments of the invention may enable efficient processing of non-homogenous time-frequency plans and adaptive TDMA (ATDMA) upstream signals.

Frequency domain channelization according to an embodiment of the invention may also facilitate noise floor spectral density estimation and noise floor based MCD initial gain setting, per channel signal RMS and instantaneous carrier-to-noise (C/N) estimation and channel activity monitoring, and burst reconstruction with block-by-block TDM signal of MCD output to enable non-homogenous Adaptive-TDMA (ATDMA) in the MCD.

An MCD according to an embodiment of the invention is a digital signal processing (DSP) device (or sub-system) that digitally separates and demodulates upstream TDMA carriers simultaneously without using multiple analog chains and analog-to-digital converters (ADC). Unlike a conventional single channel demodulator, an MCD according to an embodiment of the invention may include a function that performs frequency demultiplexing (channelization) in the frequency domain.

FIG. 1 is a block diagram of an MCD 10 according to an embodiment of the invention. In this example, analog front-end (AFE) 11 performs a down conversion of the Multicarrier TDM Signal (RF) 1 into an intermediate frequency (IF) signal 2 for band-pass filtering and IF sampling in order to avoid Inphase-Quadrature phase (I&Q) imbalance distortions which could otherwise occur with complex (baseband) sampling. The IF signal 2 then undergoes an analog to digital conversion, creating a digitized signal 3, at the ADC 110 prior to MCD 10 input.

Figure 2A:
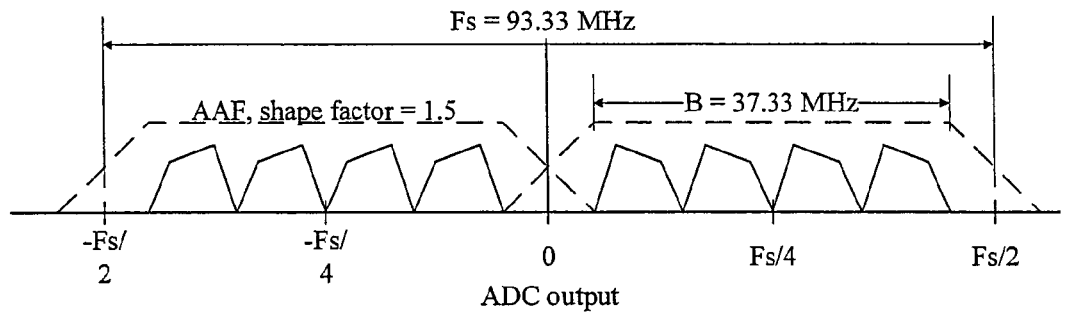
FIGS. 2A-2C are spectrum diagrams of signal outputs of an ADC, HBF, and digital channelizer according to an exemplary embodiment.

FIG. 2A shows a graph of an exemplary signal spectrum of the digitized signal 3 output from the ADC. When the digitized signal is inputted to the MCD 10, the digitized signal is filtered by a half-band filter (HBF) 100 prior to becoming channelized by the digital channelizer 102.

Figure 2B:
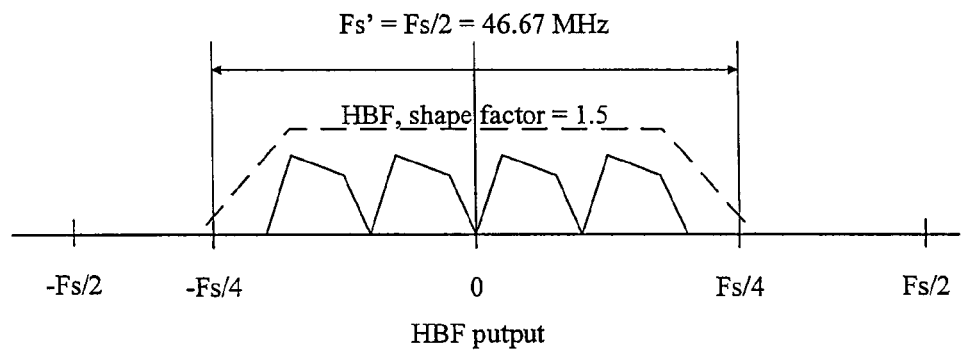
Figure 2C:
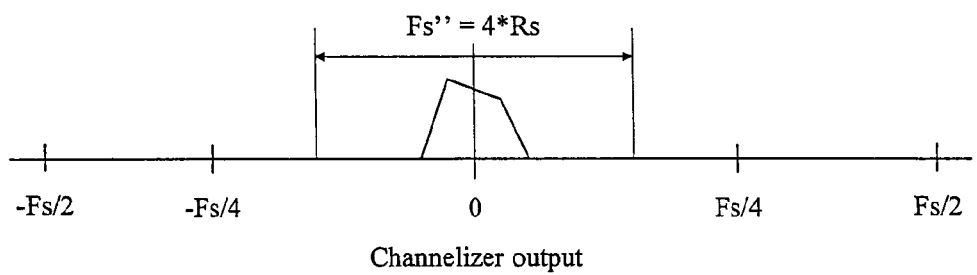

FIG. 2B shows a graph of the exemplary signal spectrum at the HBF 100 output of the MCD and FIG. 2C shows the exemplary signal spectrum at the digital channelizer 102 output of the MCD 10. In the exemplary signal spectrums illustrated in FIGS. 2A and 2B, a Shape Factor of 1.5 is assumed for both the analog anti-aliasing filter (AAF) of the ADC 110 and the HBF 100.

The digitized signal is channelized at the digital channelizer 102 to become a frequency demultiplexed channel signal. The frequency demultiplexed channel signal is inputted to the TDMA demodulator 106. A TDMA demodulator processes and demodulates a burst at a time. Because the channel symbol rate is usually much lower than the MF-TDMA signal bandwidth (e.g., 30 MHz) and a TDMA demodulator implemented in hardware, such as in a Field Programmable Gate Array (FPGA) can run at a very high clock rate, it may be a waste of hardware resources if a dedicated demodulator is used for each frequency channel. Therefore, according to an embodiment of the invention, a single TDMA demodulator can be shared amongst plural or all channels. Depending on the capacity (throughput) of the TDMA demodulator 106 within the MCD 10, a single TDMA demodulator 106 or a plurality of TDMA demodulators 106 can be used to demodulate the frequency demultiplexed channel signals according to embodiments of the invention. For a shared TDMA demodulator, channel signals may be buffered by a channel buffer 104.

Characteristics of an exemplary digital channelizer 102 for an MCD 10 according to an embodiment of the invention are summarized as follows:

| | |
|---|---|
| Max Multicarrier Bandwidth: | 36 MHz |
| Channel Symbol Rate (Rs): | 64 Ksym to 7.5 Msym |
| Channel Rolloff Factor ($\rho$): | 0.20 |
| Channel Bandwidth: | $(1 + \rho)$ * Rs = 76.8 KHz to 9.0 MHz |
| Modulation: | B/Q/8-PSK, spread spectrum or non-spread |
| FEC and rates: | Turbo Code, rate ½, ⅔, ¾, ⅘, etc. |
| Channel Spacing: | Depends on application. |
| Sampling Scheme: | Real or Complex (real preferred) |
| Sampling Frequency (Fs): | 93.333 MHz (for real sampling) |
| TDMA Demod Capacity: | 20 Msym |

Channel spacing is defined as the distance between center frequencies of two adjacent channels. If the two adjacent channels have the same symbol rate Rs, the most compact channel spacing is $(1+\rho)$*Rs. The channel spacing varies if the two adjacent channels have different symbol rates even if they have a same rolloff.

In convention signal processing methods, frequency demultiplexing algorithms can be generally classified into two categories: the time-domain approach and the frequency-domain approach. The frequency-domain approach of an MCD 10 according to an embodiment of the invention may include a fast convolution (e.g., overlap-add and overlap-save Fast Fourier Transform (FFT) and Inverse Fast Fourier Transform (IFFT) structures) and analysis-synthesis filter banks. An advantage of the frequency-domain approach according to an embodiment of the invention is the processing flexibility it provides because it allows use of almost any frequency plan. A frequency plan is a particular arrangement of multiple modulated carriers in the frequency domain, i.e., the allocation of channel bandwidth (symbol rate) and the assignment of the center frequency of each channel (carrier). A uniform frequency plan has identical channel bandwidth and equal channel spacing for all channels.

A multi-stage demultiplexing approach can be extended to form a generic tree structure in which each demultiplexing node is in general a K-channel polyphase FFT, where K varies from node to node. Such a generic tree improves the flexibility at the expense of increased complexity.

An embodiment of the MCD 10 according to the invention includes channelization corresponding to an overlap-save FFT/IFFT architecture because of the flexible frequency plan capability such an approach provides and due to the feasibility for large FFT/IFFT implementation in hardware.

Figure 3:
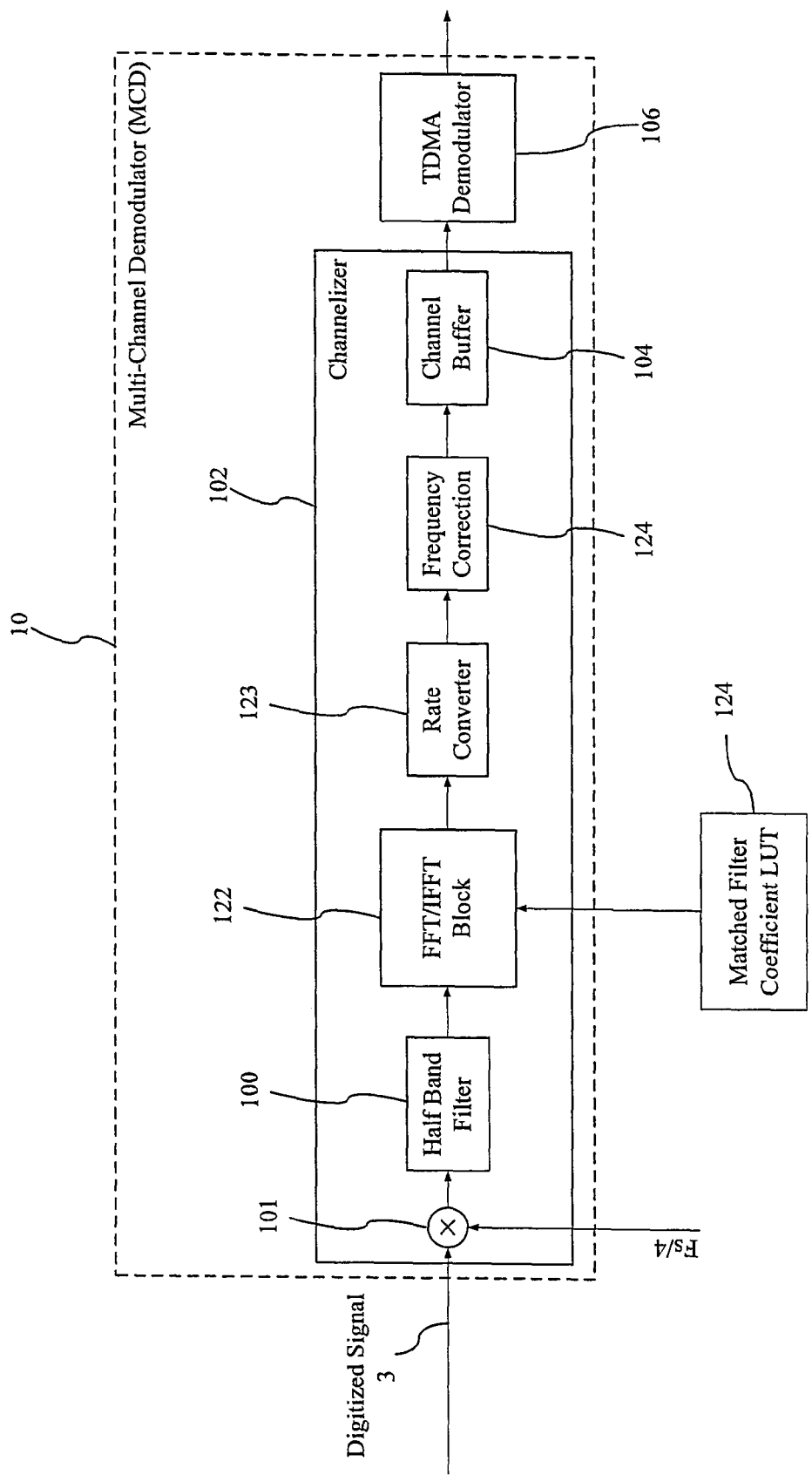
FIG. 3 is a block diagram of a frequency domain channelizer (FDC) according to an exemplary embodiment.

FIG. 3 shows a detailed block diagram of an MCD 10 according to an embodiment of the invention, which includes an exemplary MCD channelizer 102, a subset of the MCD 10, when a real-to-complex converter 101 and channel buffer 104 are also considered part of the channelizer functions. The core of the MCD channelizer 102 is the overlap-save FFT/IFFT block 122 that performs fast convolution in the frequency domain.

Figure 4:
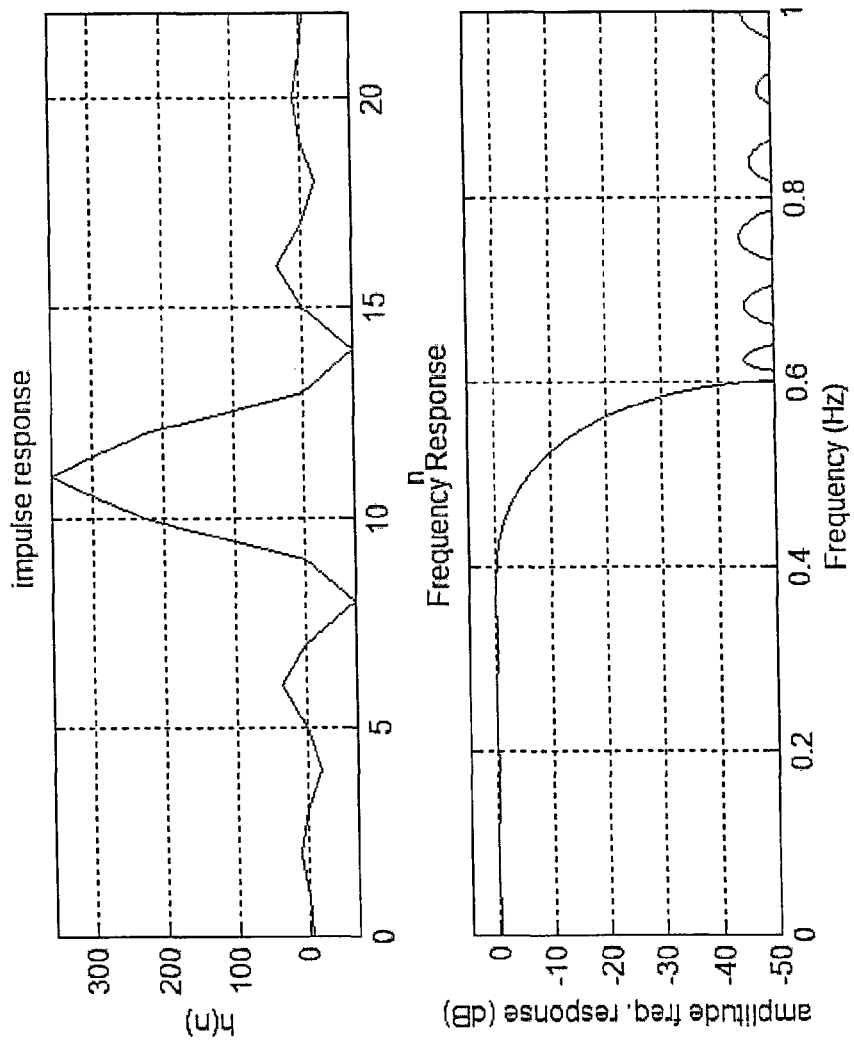
FIG. 4 is the impulse response graph and frequency response graph of a finite impulse response filter according to an exemplary embodiment.

As shown by the signal spectrum at HBF 100 output in FIG. 2B, the real-to-complex converter 101 selects the upside signal spectrum of the digitized signal 3 and performs a decimation-by-2 operation. According to an exemplary embodiment of the invention, the real-to-complex converter 101 is a 23-tap half-band finite impulse response (FIR) filter whose impulse response and frequency response are plotted in FIG. 4. The HBF 100 coefficients are properly scaled and quantized so that the real-to-complex converter 101 keeps unit gain of the spectral density at DC. In other words, the gain of the HBF at f=0 is 1. Consequently, the sample rate of the digitized signal 3 is halved without changing the signal spectral density (or the wanted signal energy). Fs/4 is a quarter sampling frequency shift ($\pi/2$ frequency shift). Mathematically, it modulates the incoming signal with a sequence $\exp(-j*n*\pi/2)=1$, $-j$, $-1$, $j$, $1$, $j$, $-1$, $j$, . . . .

Figure 5:
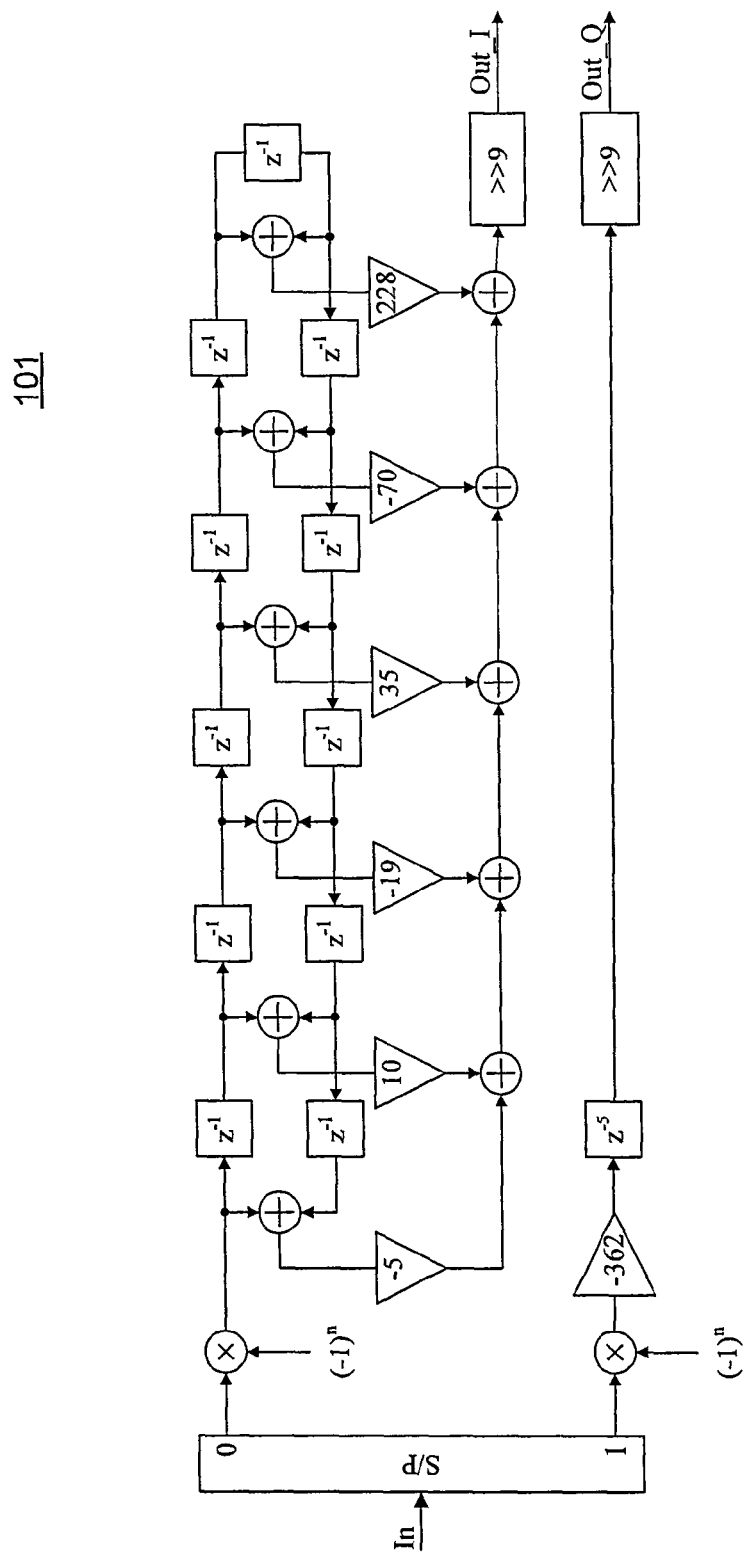
FIG. 5 is a block diagram of an implementation structure for the real-to-complex converter according to an exemplary embodiment.

FIG. 5 shows an embodiment of a real-to-complex converter 101. The real-to-complex converter 100 can be efficiently implemented using, for example, a polyphase decimation filter structure. In this example implementation of, a trivial frequency shift of $\pi/2$ is used.

A conventional system that performs channelization in the time domain using efficient filter banks has strict constraints on carrier locations and therefore, requires carriers be uniformly spaced and the sampling frequency be an integer multiple of the spacing. As previously discussed, in order to accommodate flexible frequency plans with simultaneous multiple symbol rates, a frequency domain filtering approach according to the invention may provide significant advantages.

There are basically two types of conventional frequency filter structures: the Overlap-Save (OS) structure and the Overlap-Add (OA) structure. Both of these structures are based on the concept of fast convolution. The requirement for overlapping between adjacent signal blocks is due to the fact that fast convolution is applicable only to circular convolution, hence segmentation and overlapping techniques are necessary when used in linear convolutions.

Both of the conventional OS and OA structures can be used for frequency demultiplexing applications according to embodiments of the invention. Since OS structure is believed to be simpler and easier to implement relative to the OA structure, it is thus selected for implementing the exemplary MCD channelizer 102 although either structure can be used.

With fast convolution, time domain filtering (convolution) is conventionally performed in the frequency domain by pairwise multiplying frequency bins of the signal with the corresponding points of the channel filter frequency response. To minimize complexity, a simple rectangular window is used in such a convention system as the channel filter (i.e., an ideal bandpass filter in the frequency domain) resulting in the pairwise multiplications becoming trivial.

Traditionally, the OS and OA structures assume an x:y type of overlap, which means the overlap length is x out of the signal segment length of y. This kind of overlap scheme, however, requires large overlap ratio (defined as x/y) due to time-domain aliasing after IFFT. To minimize the effect of time-domain aliasing, x:y:x type of overlap scheme (overlap ratio=2x/y) is recommended because the resulting equivalent time domain filter is causal and linear phase. It has been determined that 1:8:1 overlap, according to an embodiment of the invention, gives a good compromise of performance and complexity. The OS FFT/IFFT architecture to be discussed hereafter assumes 1:8:1 overlap scheme. It is noted, however, that the invention includes any overlap scheme which may be appropriately selected based on the application and performance characteristics desired by a person having ordinary skill in the art.

Figure 6:
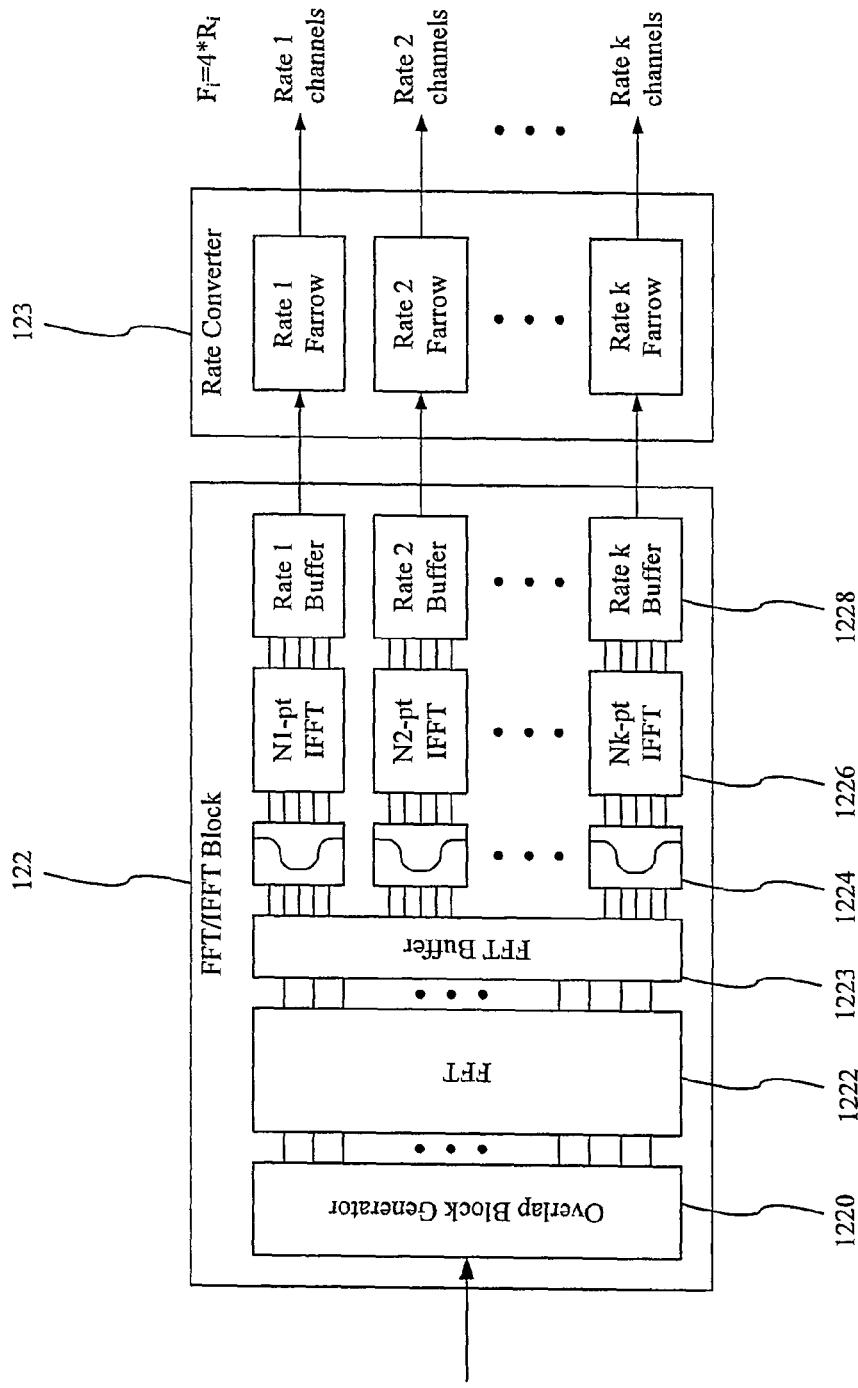
FIG. 6 is a block diagram of a parallel architecture of the OS-FFT/IFFT channelizer according to an exemplary embodiment.

FIG. 6 shows an MCD channelizer 102 parallel architecture according to an embodiment of the invention. The FFT/IFFT Block 122 includes an overlap block generator 1220, an FFT 1222, and plural IFFTs 1226. To reduce complexity and memory requirements for the channel buffers 1228, the matched filtering (MF) 1224 is done in frequency domain by shaping channel spectra before IFFTs 1226 with a Square-Root Raised Cosine (SRRC) spectral mask. IFFT 1226 sizes are determined by channel symbol rates. As shown in FIG. 6, channels with the same symbol rate share a common frequency domain MF 1224 and a common IFFT 1226. The number of IFFTs 1226 is therefore the number of symbol rates for a given frequency plan.

FIG. 7 shows some examples of MCD channelizer 102 parameter settings. These parameters are functions of the symbol rate and the center frequency of the channel. The parameters presented in FIG. 7 include IFFT size, IFFT sample rate, interpolation ratio of the rate converter, the frequency bin location of IFFT center, and the residual frequency error due to the offset of the IFFT center from the true center frequency of the channel.

In a non-limiting example, such as with MPSK modulated signals, it may be desirable to have frequency resolution better than 20 frequency bins per symbol rate bandwidth (bins/Rs) in order to have good filter performance. It can be shown, for example, that an FFT size of 16K (Nfft=16384) may be required in order to meet the minimum frequency resolution requirement for a minimum supported symbol rate of 64 Ksym.

IFFT size may be selected to be an integer power of 2. The IFFT size is determined by the following formula:

$$N_{ifft} = 2^{\left\lceil \log_2\left(\frac{nsps_{ifft,max} \cdot R_s \cdot N_{fft}}{F_{s,fft}}\right) \right\rceil} \quad \text{Equation 1}$$

or, for Spread Spectrum:

$$N_{ifft} = 2^{\left\lceil \log_2\left(\frac{nsps_{ifft,max} \cdot R_c \cdot N_{fft}}{F_{s,fft}}\right) \right\rceil} \quad \text{Equation 2}$$

where $R_s/R_c$ is the symbol rate in symbols/second (or chip/second), $nsps_{ifft,max}/nspc_{ifft,max}$ is the maximum sample rate at IFFT input in number of samples per symbol (or chip), and $F_{s,fft}$ is the sample rate at FFT input in Hz.

Regardless of channel symbol rate (or chip rate), the exemplary MCD channelizer 102 should generally produce 2 samples per symbol channel output for B/Q/8-PSK signals and 4 samples per chip for Spread Spectrum carriers.

According to an embodiment of the invention, there is no constraint on IFFT input rate (in terms of samples per symbol or chip) as long as the IFFT input rate is higher than the channel bandwidth, for example 1.2*Rs or 1.2*Rc. To minimize aliasing/imaging effects of the Farrow re-sampler, however, it is desirable to have the IFFT input rate as close to the desired IFFT output rate as possible. As shown in Eq. (1) and (2), the higher the input sample rate the larger the IFFT size. As a tradeoff, an IFFT input sample rate not exceeding 3 samples per symbol (or chip) may be chosen for an embodiment of the invention so that the maximum IFFT size of 4096 can handle a maximum symbol rate (chip rate) of 7.5 Msym (Mchip).

With the above constraint and with the IFFT size determined by Equation 1 and 2, the IFFT input and output rate for this example will be in the range of 1.4 to 2.8 samples per symbol (or chip) and it is given by $$nspc_{ifft} = \frac{F_{s,fft}}{R_s} \cdot \frac{N_{ifft}}{N_{fft}} \quad \text{Equation 3}$$

To produce the desired 2 samples per symbol or 4 samples per chip at channelizer output, a Farrow re-sampler is used. The conversion ratio of the re-sampler is given by $$\frac{L}{M} = \frac{R_s}{F_{s,fft}} \cdot \frac{N_{fft}}{N_{ifft}} \cdot nsps_{ch} \quad \text{Equation 4}$$

or, for Spread Spectrum, $$\frac{L}{M} = \frac{R_c}{F_{s,\mathit{fft}}} \cdot \frac{N}{N_{\mathit{ifft}}} \cdot nspc_{ch},\qquad\text{Equation 5}$$

where L is the Farrow interpolation factor, M is the decimation factor, $nsps_{ch}$ is the desired channelizer output rate expressed in samples per symbol (e.g., =2 samples per symbol), and nspcch is the desired channelizer output chip rate (4 samples per chip).

As a result and as shown by the examples illustrated in FIG. 7, Farrow rate conversion ratio is for is in the range of 5/7 to 10/7 regular B/Q/8-PSK carriers and in the range of 10/7 to 20/7 for Spread Spectrum carriers.

Figure 8:
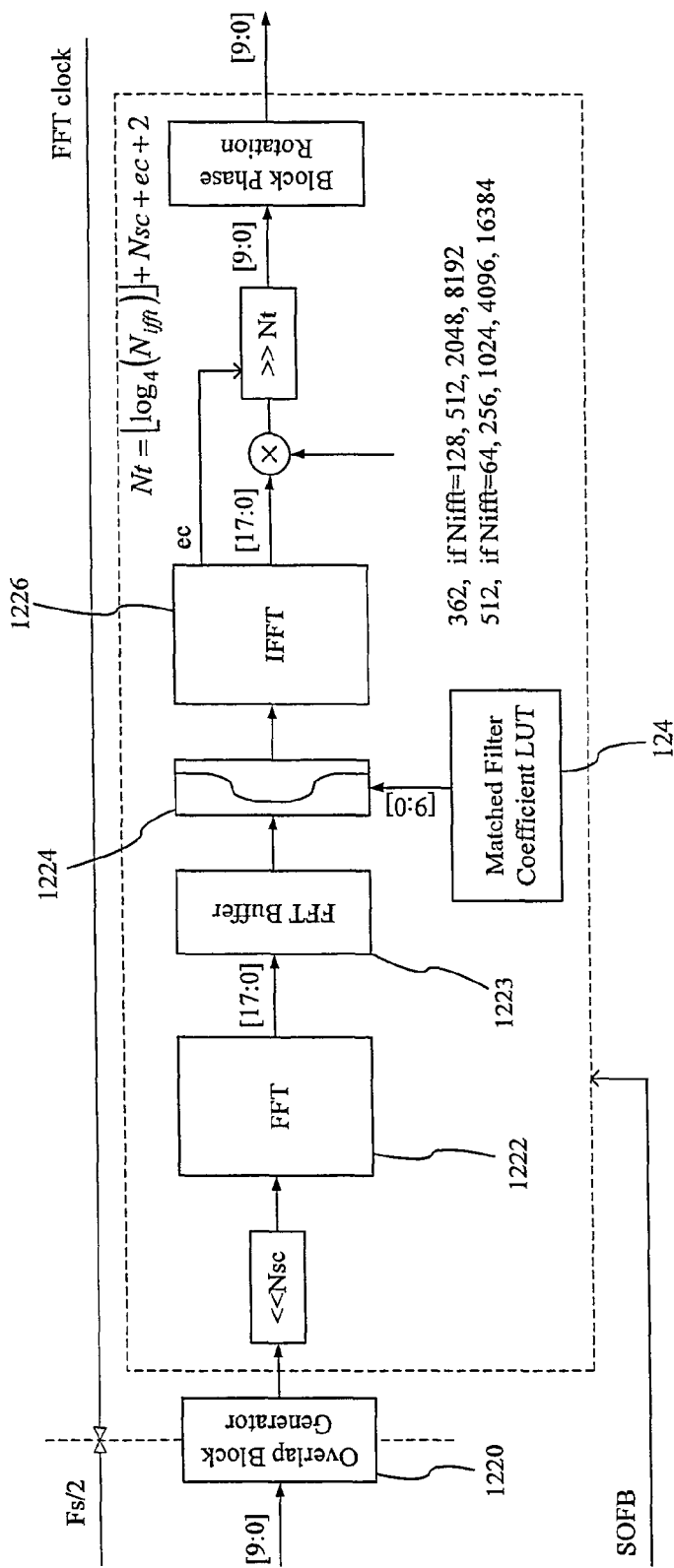
FIG. 8 is a block diagram of an architecture of a digital channelizer implementing a shared configurable IFFT according to an exemplary embodiment.

FIG. 8 shows a more efficient architecture where a shared configurable IFFT is used to reduce complexity. According to an embodiment of the invention, a signal precision of 18 bits for the FFT and FFT processor is sufficient to handle the dynamic range of the multi-channel signals. For example, after converting input blocks (12288 samples each) into overlapped blocks of 16384 samples, the FFT processes a 16384-sample a block at a time. Since the FFT core has better performance if the input signal occupies the whole number space of the specified signal precision (18 bits in this case), the 14-bit multi-channel signal may be scaled up (shifting left by Nsc bits, as shown in the FIG. 8) such that the FFT input reaches or is close to 18 bits.

The FFT channel buffer 104 reassembles an FFT output block to form an IFFT input block that consists of a number of smaller IFFT sub-blocks. The FFT channel buffer 104 groups frequency bins of channels of the same symbol rate together and, for the sake of reducing processing latency, places the IFFT sub-blocks in an ascending order (i.e., the smallest IFFT sub-blocks first and the largest ones last).

The matched filtering (MF) is done using a pair of real multipliers to shape the channel spectrum with real SRRC coefficients that are read from a MF coefficient look-up table (LUT) 124. Following the previous example, the LUT stores and generates up to 16384 MF coefficients. The number of MF coefficients stored within the MF coefficient LUT 124 required for each channel is proportional to the IFFT size which is determined by the channel symbol rate and the sample rate (number of samples per symbol) at IFFT input.

In order to have the same DC gain to all channels, the IFFT output should be scaled down by a factor proportional to the square root of IFFT size. As a result, the exemplary scaling factor shown in FIG. 8 will be 362/512 (~1/√2) for Nifft=128, 512, 2038, 8192 and 512/512=1 for Nifft=64, 256, 1024, 4096, and 16384. SOFB in FIG. 8 represents a signal indicating Start of FFT Block. The final truncation is necessary for bringing the demultiplexed channel signals back to 10 bits. Note that the truncation amount (Nt) includes an amount (ec) indicating how many bits the IFFT output is scaled up by the IFFT core. This amount is given by an output signal 'exponential output' of the core. The block phase rotation is used to minimize the residual frequency errors. The structure of this block will be described later.

Figure 9:
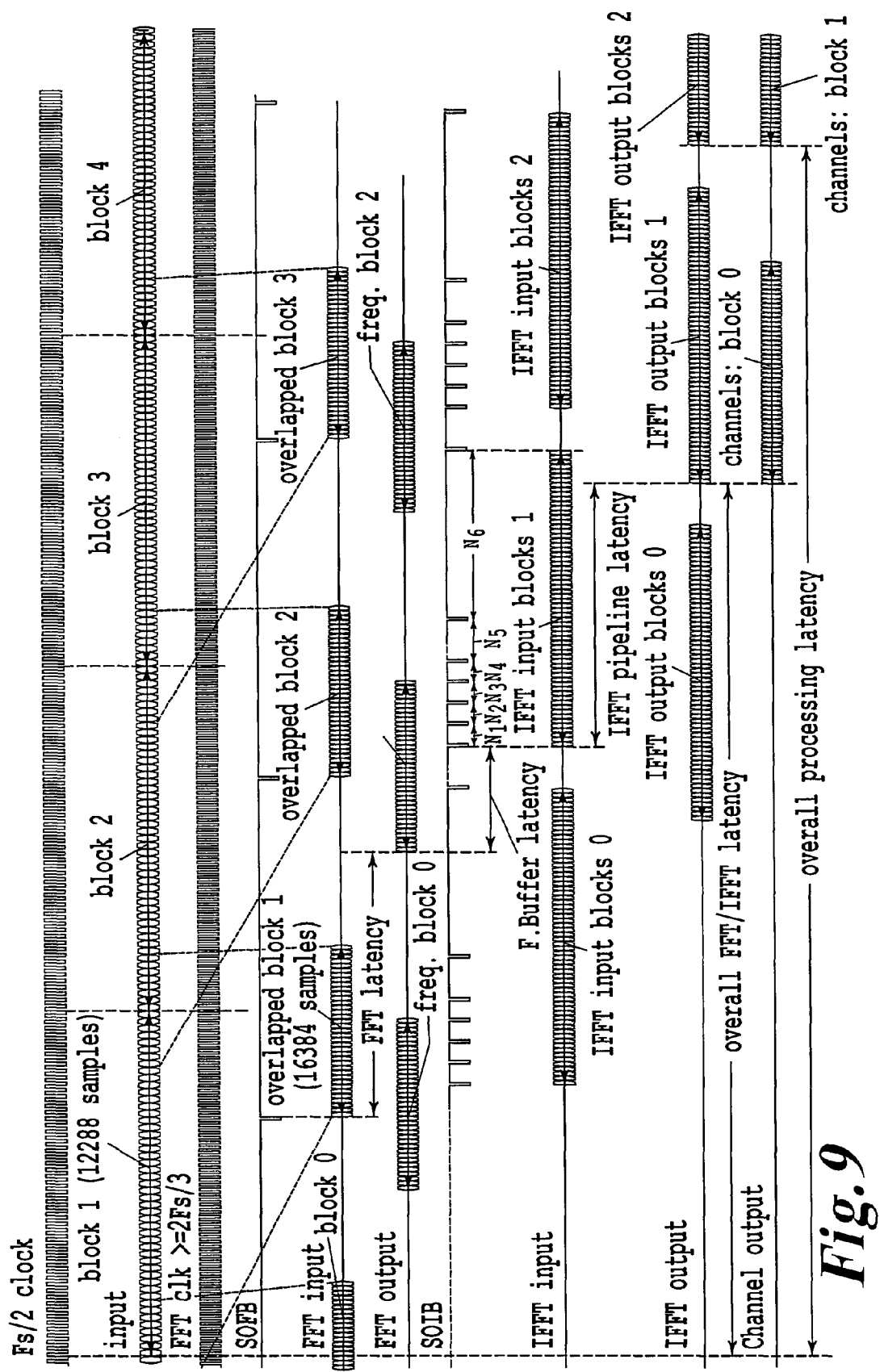
FIG. 9 is a timing diagram of the FFT/IFFT architecture according to an exemplary embodiment.

FIG. 9 shows the timing relationship of the above described FFT/IFFT architecture. For an overlap ratio of 1:4 (or 1:8:1), the overlap-save FFT/IFFT process, according to one embodiment of the invention, requires that the IFFT center (DC bin) be located on a frequency grid of {0, ±4, ±8, ±12, ... } in units of the frequency resolution (=0.5*Fs/Nfft), which may lead to large residual frequency errors if the true center frequency of the channel happens to be on a mid point of the grid. This would be a limitation if a block phase rotation technique is not used. According to an embodiment of the invention, for an overlap ratio of 1:4, the granularity of the DC grid can be minimized to {0, ±1, ±2, ±3, ... } by modulating the IFFT output blocks with a sequence $(j)^{fc\_bin*k}$, where k=0, 1, ... is the IFFT block index and fc_bin is the frequency bin index of the selected center frequency. That is, the center frequency grid is the same as the frequency resolution grid in such an embodiment. Therefore, the carrier center frequency according to the embodiment can be rounded to the nearest point on the grid {−8192, −2047, ... , −1, 0, 1, 2, ... , 8191} and chosen as the selected center frequency (fc_bin).

Figure 10A:
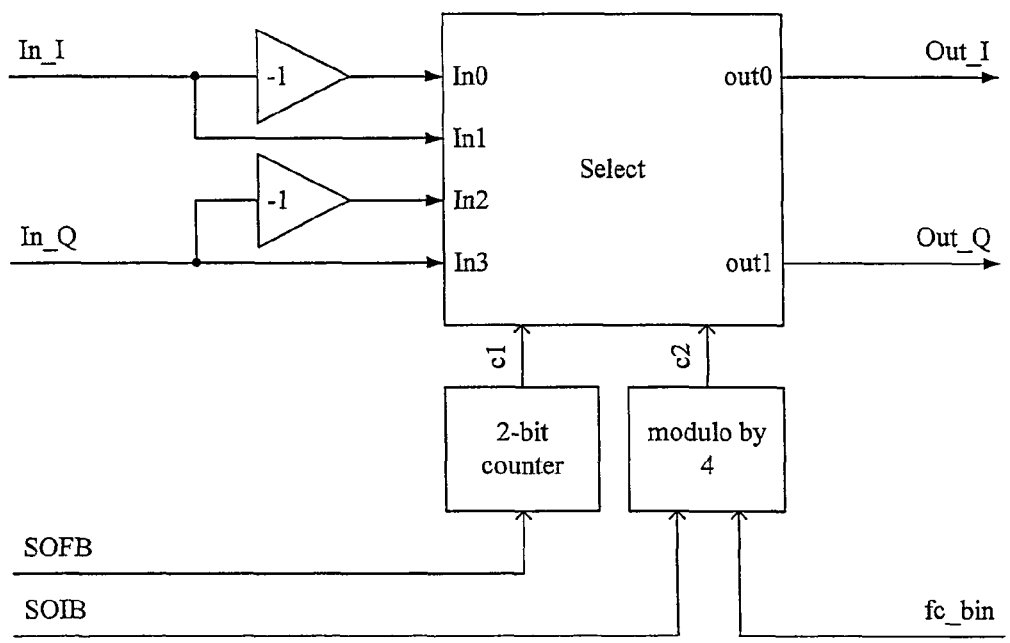
FIGS. 10A and 10B are a block diagram and a timing diagram, respectively, of the block phase rotator and associated control signals according to an exemplary embodiment.
Figure 10B:
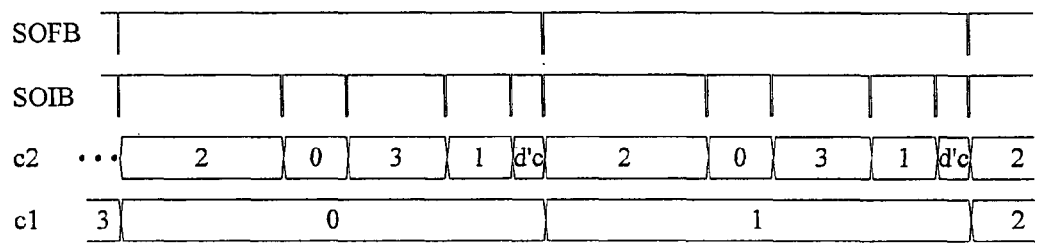

The block modulation of $(j)^{fc\_bin*k}$ is referred to the block phase rotator. FIG. 10A is a block diagram of a block phase rotator according to an embodiment of the invention. Associated control signals and timing are illustrated in FIG. 10B. FIG. 11 is an exemplary truth table of a selection of control signals presented in FIG. 10B.

If contiguous frequency samples (bins) of a channel signal are sent to the IFFT directly, the recovered channel signal will be π-frequency shifted because the channel is centered at the half-sampling frequency point prior to the IFFT. This frequency shift can be removed by simply swapping the first half and the second half of the frequency samples of the channel signal prior to the IFFT. This frequency domain π-shift will be part of the function FFT buffer 1223 shown in FIG. 8.

According to an embodiment of the present invention, channel filtering in the frequency domain performs band-pass filtering to select desired channels and, at the same time, to perform matched filtering of each of the channels. An SRRC type matched filter is used as the channel filter.

The IFFT performs several IFFTs with different transform sizes. Each of the IFFTs reconstructs the time-domain channel signal from frequency bins of the channel. Since the number of frequency bins sent to the IFFT covers a bandwidth much wider than the channel bandwidth (IFFT output has a sample rate of 2~4 samples per symbol), a frequency-domain matched filtering is performed before IFFT. This filter can as simple as a SRRC window covering the channel bandwidth. Any frequency bins outside the window can be nulled to zero.

The advantages of using the frequency domain window include a reduced IFFT buffer size. The FFT Buffer only has to store frequency samples within the channel bandwidth. When IFFT reads channel bins from the buffer, zeros are appended on both ends of the channel frequency sample block. Another advantage includes less distortion caused by the rate converter. If the frequency samples are not filtered, the retrieved time-domain signal could have a bandwidth that is wider than the channel bandwidth. This 'wide-band' signal may cause undesireably high distortion in the channel signal when it is processed by the Farrow rate converter.

Channel filtering in the frequency domain according to an embodiment of the invention includes multiplying frequency bins at FFT output with their corresponding real-valued MF coefficients from the MF coefficient LUT 124. It may be difficult to generate the frequency domain MF coefficients for each channel because MF coefficients vary with symbol rate, which can be any value as required by the application. For example, a remote that communicates according to one possible embodiment of the invention can transmit modulated burst signals at any symbol rate from between 64 Ksym and 7.5 Msym at step size of 1 sym. (e.g., 64000 sym and 100001 sym are supported but 64000.5 sym is not supported).

Figure 12:
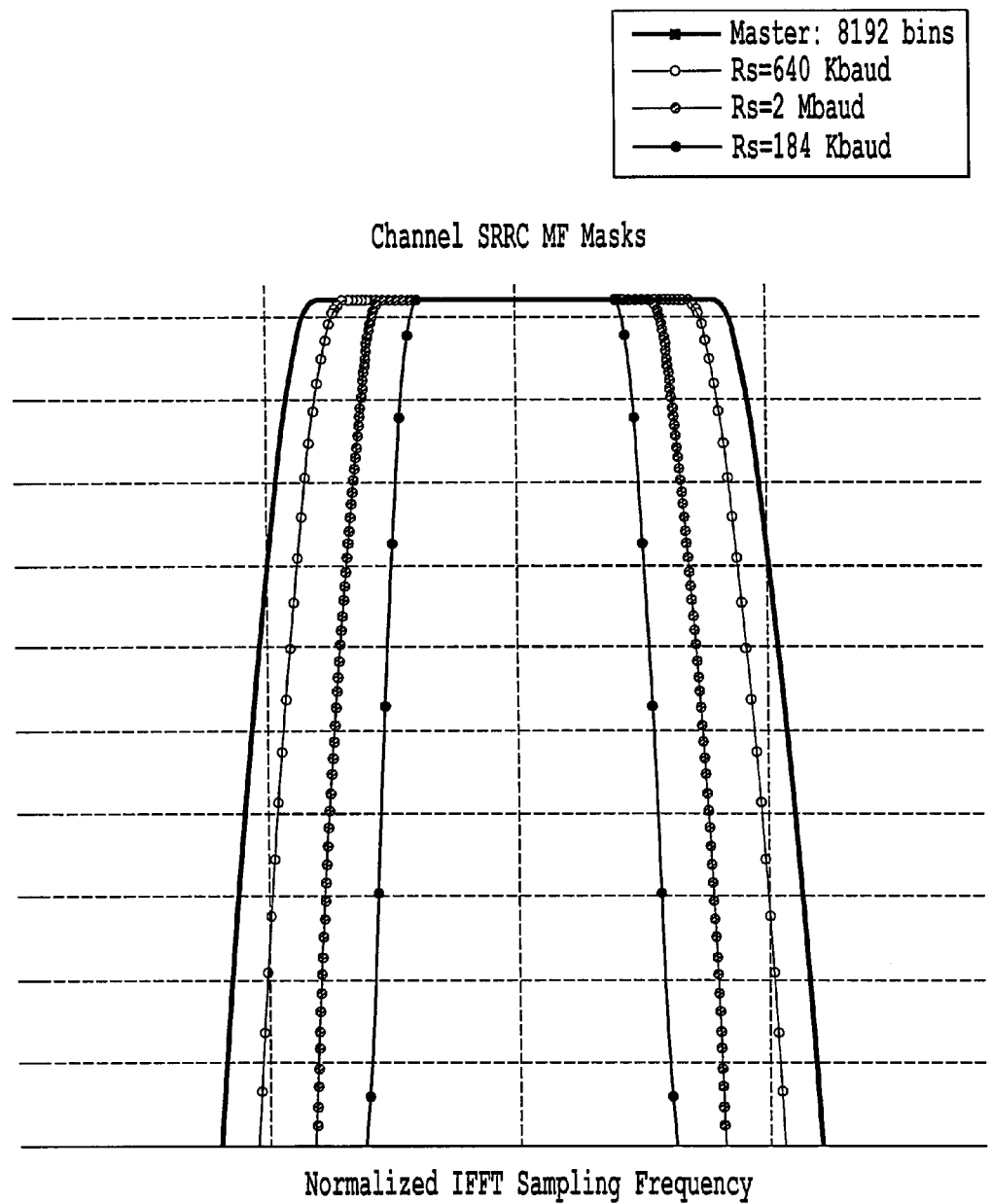
FIG. 12 is a normalized frequency domain graph of an exemplary channel MF mask generated from an SRRC MF master mask.

FIG. 12 shows an example of channel MF mask generation using a 8192-bin SRRC MF mask. In this example, the oversampled MF mask has a roll-off of 20% and is called a master MF mask. The frequency axis of the figure is the normalized IFFT sampling frequency (by $N_{ifft}*\Delta f$, where $\Delta f=F_{s,fft}/N_{fft}$ is the frequency bin resolution). All samples of channel MF masks are generated from the master MF via the MF coefficient LUT 124.

FIG. 9 shows the exemplary SRRC frequency domain filter. Since the filter is symmetric and has constant 1's (quantized to 1023 in FIG. 9) in center and 0's in stop band, the filter allows the generation of channel MF masks using the MF coefficient LUT 124 that only stores non trivial coefficients of one of the two filter transients.

Because of the symmetry, only the right half of the mask, from bin 0 to bin ($N_{ifft}/2-1$) of the mask, needs to be generated according to an embodiment of the invention. An exemplary procedure and associated formula for channel MF generation according to an embodiment of the invention is presented as follows:

$$N_{ones,o} = \left\lfloor \frac{Nbins_{master}*\left(0.5-\frac{rolloff}{2}\right)}{nsps_{master}} \right\rfloor \quad \text{Equation 6}$$

$$N_{trans,o} = \left\lfloor \frac{Nbins_{master}*rolloff}{nsps_{master}} \right\rfloor + 1 \quad \text{Equation 7}$$

$$nsps_{fft} = \frac{F_{s,fft}}{Rs} \quad \text{Equation 8}$$

$$nsps_{ifft} = \frac{N_{ifft}}{N_{fft}}*nsps_{fft} \quad \text{Equation 9}$$

$$rat\left(\frac{2\left\lceil \frac{0.5*Nbins_{master}*nsps_{ifft}}{nsps_{master}} \right\rceil}{N_{ifft}}\right) = \frac{num}{den} \quad \text{Equation 10}$$

$$s(n)=(\{0,1\cdot den, 2\cdot den, \ldots, n\cdot den, \ldots, (N_{ones,o}+N_{trans,o})\cdot den\})_{num} \quad \text{Equation 11}$$

$$ind_{swrap} \approx \{n|n=0 \text{ or } \forall n, s(n)-s(n+1)>0\} \quad \text{Equation 12}$$

$$N_{ones}=\text{length}(\{i|i\in ind_{swrap}, i\leq N_{ones,o}\}) \quad \text{Equation 13}$$

$$addr_{LUT}=\{i|i\in ind_{swrap}, i>N_{ones,o}\} \quad \text{Equation 14}$$

$$N_{trans}=\text{length}(addr_{LUT}) \quad \text{Equation 15}$$

$$N_{zeros}=\frac{N_{ifft}}{2}-N_{ones}-N_{trans} \quad \text{Equation 16}$$

$$H_{trans}(n)=LUT(addr_{LUT}(n)), n=0,1,2,\ldots,N_{trans}-1 \quad \text{Equation 17}$$

$$H_{ones}(n)=H_{max}, n=0,1,2,\ldots,N_{ones}-1 \quad \text{Equation 18}$$

$$H_{zeros}(n)=0, n=0,1,2,\ldots,N_{zeros}-1 \quad \text{Equation 19}$$

$$H_{halfmask}=\text{concat}(H_{ones}H_{trans}H_{zeros}) \quad \text{Equation 20}$$

$$H'_{halfmask}(n) = H_{halfmask}(n+1), \quad \text{Equation 21}$$
$$n = 0, 1, 2, \ldots, \frac{N_{ifft}}{2}-2$$

$$H_{fullmask}=\text{concat}(0,\text{flip}(H'_{halfmask})H_{halfmask}) \quad \text{Equation 22}$$

In the example provided by the above equations, $Nbins_{master}=8192$, $rolloff=0.2$, $nsps_{master}=2$, and $H_{max}=1023$. Functions used in above equations have the following definitions:

| | |
|---|---|
| $\lfloor \cdot \rfloor$ | flooring function. |
| $\lceil \cdot \rceil$ | ceiling function. |
| rat | fraction representation (num/dem) of a rational number. |
| length | the number of elements (length) of a vector. |
| concat | ordered concatenation of vectors. |

Parameters in above equations have the following definitions:

| | |
|---|---|
| $F_{s,fft}$ | the sampling frequency of FFT input. |
| $R_s$ | the symbol rate of the channel (carrier). |
| $N_{ones,0}$ | the number of ones (the peak value) in a half of the master MF mask. |
| $N_{trans,0}$ | the number of bins in the transient of a half master MF mask. |
| $N_{ones}$ | the number of ones (the peak value) in a half of the channel MF mask. |
| $N_{trans}$ | the number of bins in the transient of a half channel MF mask. |
| $N_{zeros}$ | the number of zeros in a half of the channel MF mask. |
| $addr_{LUT}$ | addresses of transient bins of the channel MF mask. |
| $H_{ones}$ | all-ones portion of a half channel MF mask. |
| $H_{trans}$ | transient portion of a half channel MF mask. |
| $H_{zeros}$ | all-zeros portion of a half channel MF mask. |
| $H_{halfmaxk}$ | the right half (positive frequency side) of a channel MF mask. |
| $H_{fullmaxk}$ | the complete channel MF mask. |

Figure 13:
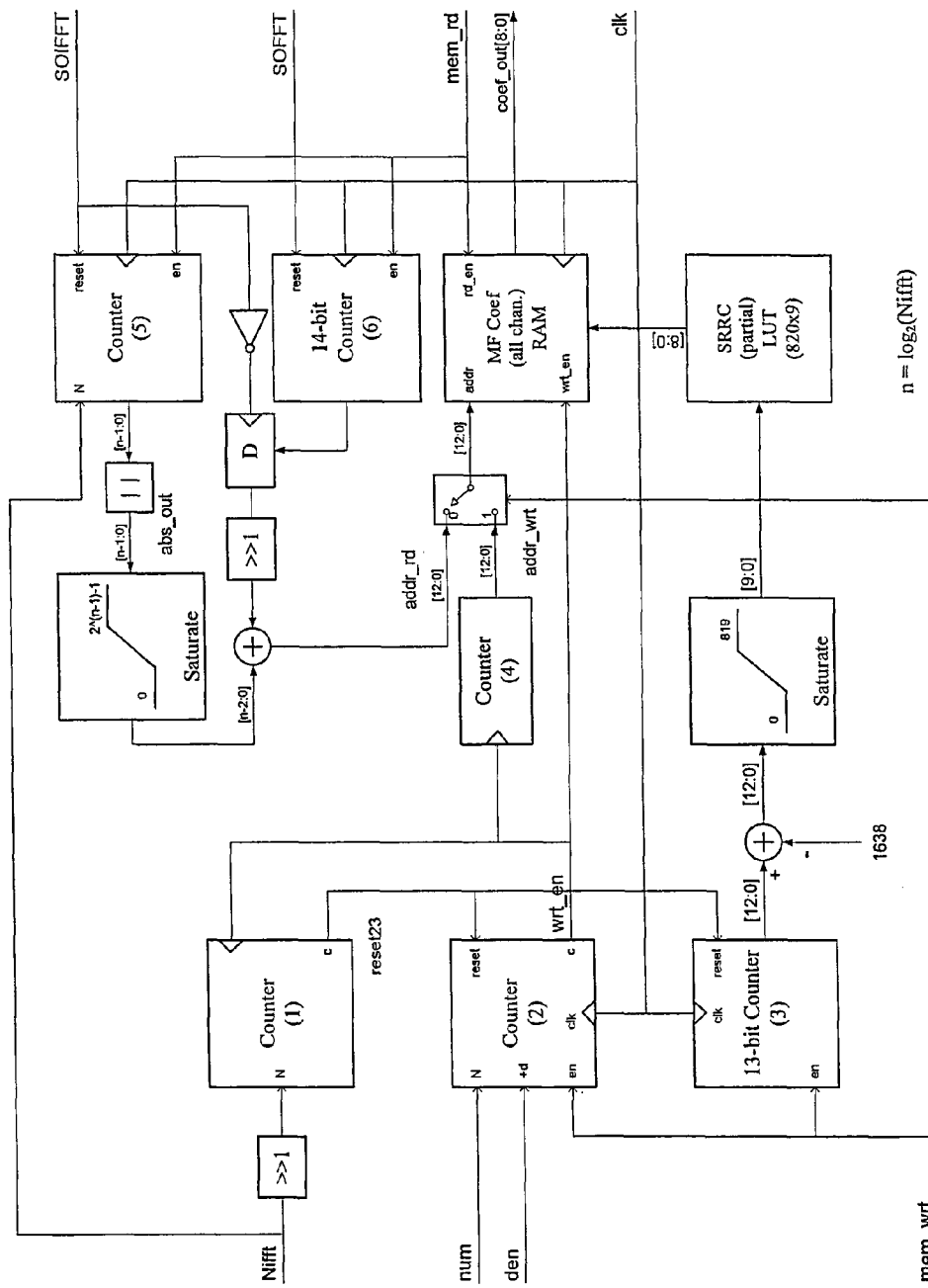
FIG. 13 is a block diagram of a frequency domain MF coefficient generator according to an exemplary embodiment.

FIG. 13 is a schematic diagram of an embodiment of the invention performing frequency domain MF coefficient generation using an efficient implementation structure. In this embodiment, MF coefficients (for all channels) are generated and loaded to a RAM each time the frequency plan changes. The coefficient generator uses the MF coefficient LUT 124 to store 820 9-bit samples of the right side transient of the master SRRC MF filter shown in FIG. 12. A RAM of 8192×9 bits (TBC) is allocated to store the generated one-sided channel MF coefficients of all channels. The total time required for MF coefficient generation is roughly $$T=8192*\text{num\_of\_channels}*Tclk, \quad \text{Equation 23}$$

where Tclk is the clock period of the system clock at which the generator is running.

According to the embodiment of the invention shown in FIG. 13, channel MF coefficients may be generated in real-time ("on the fly"). This is made possible by the IFFT being time-shared by all channels and the IFFT processing the plural channels in "round robin" (i.e., one at a time in turn). As a result, only one MF coefficient of a channel is needed to multiply with an IFFT bin of the channel at any instant of time. So, channel MF coefficients are generated in real time, and advantageously, for good efficiency, there is no need to store all the channel MF coefficients. As shown in FIG. 13, the MF Coef (all chan.) RAM block above the SRRC LUT block is a RAM memory used to store the channel MF coefficients and is shared by all channels (not for storing coefficients of all channels). The MF Coef (all chan) is loaded with a new set of generated channel coefficients when the IFFT switches to process another channel.

According to an exemplary embodiment of the invention, a Square Root Raised Cosine (SRRC) shaped master matched filter of 8192 bins (or coefficients) in frequency domain is used. The Nyquist bandwidth is at bin 2048 (so that the digital sample rate of the master MF is exactly at 2 samples per symbol). Furthermore, plural of the master matched filter coefficients that correspond to the right side of the filter skirt (transient portions of the SRRC filter) are stored in a matched filter coefficients lookup table.

For a given channel symbol rate (e.g., 64 Kbaud), FFT size $N_{fft}$=8192, sampling frequency at FFT (e.g., 47 MHz), and IFFT size $N_{ifft}$=256 assuming $nsps_{ifft,max}$=4, per Equation 1, a decimation factor (D) which is in general a rational number that can be represented by D=num/den and can be determined (num=1175 and den=32, hence D=1175/32=36.7188 for the given example) according to Equations 8, 9, and 10. In particular, using the above parameters, Equation 8 produces $nsps_{fft}$=47 MHz/64 Kbaud=47/0.64=73.4375; Equation 9 produces $nsps_{ifft}$=(256/8192)*73.4375=2.2949; and Equation 10 produces num/den=2*ceil(0.5*8192*2.2949/2)/256=9400/256=1175/32. Thus, the decimation factor is selected based on the channel symbol rate (Rs), sampling frequency at FFT ($F_{s,fft}$), a number of bins in the master filter ($Nbins_{master}$), a normalized sample rate of the master MF ($nsps_{master}$), and the IFFT size of the channel ($N_{ifft}$). In another embodiment, the decimation factor is selected based only on the channel symbol rate, a maximum sample rate at an IFFT input, a sample rate at an FFT, and the size of the FFT. The normalized sample rate of the master MF is normalized by the symbol rate, and therefore, is represented as the signal sample rate in terms of number of samples per symbol (nsps), instead of using an absolute frequency in Hz or baud rate. Thus, the decimation factor D is based at least on Rs, $F_{s,fft}$, Nfft, $Nbins_{master}$, $nsps_{master}$, and $nsps_{ifft,max}$ and can be calculated according Eqs. 1, 8, 9, and 10. For a given implementation, $F_{s,fft}$, Nfft, $Nbins_{master}$, $nsps_{master}$, and $nsps_{ifft,max}$ are all deterministic. For the non-limiting example given here, we have: $F_{s,fft}$=47 MHz, Nfft=8192, $Nbins_{master}$=8192, $nsps_{master}$=2, $nsps_{ifft,max}$=4. Thus, for a given implementation, D may depend only on channel symbol rate $R_s$.

The coefficients of the right side skirt of the channel matched filter are obtained by decimating the 820 master coefficients with this rational decimation factor. In doing so, an index sequence ind0={1, 1+⌈D⌉, 1+⌈2D⌉, 1+⌈3D⌉ . . . } (or {1, 38, 75, 112, 148, 185, 222, 259, 295, . . . , 1617, 1654, 1691, . . . } for the given example) is generated. The coefficient decimation indices (or the address of the 820-entry coefficient LUT) are non-negative terms of ind0−$N_{ones,0}$ and having a constraint such that values of all valid terms must not exceed the predetermined LUT size limit, which is 820 in this example. The parameter $N_{ones,0}$ is determined by Equation 6. For the given example, $N_{ones,0}$=1638 hence having ind0−$N_{ones,0}$={−1637, −1600, −1563, −1526, . . . , −58, −26, 16, 53, 89, 126, 163, . . . , 713, 750, 787, 824, 860, . . . }. The resultant decimation indices (addresses of the LUT) are therefore {16, 53, 89, 126, 163, . . . , 713, 750, 787}, and coefficients corresponding to indices {1-15, 17-52, 54-88, 90-162, . . . etc. . . . } are omitted based on the decimation factor D.

Figure 14:
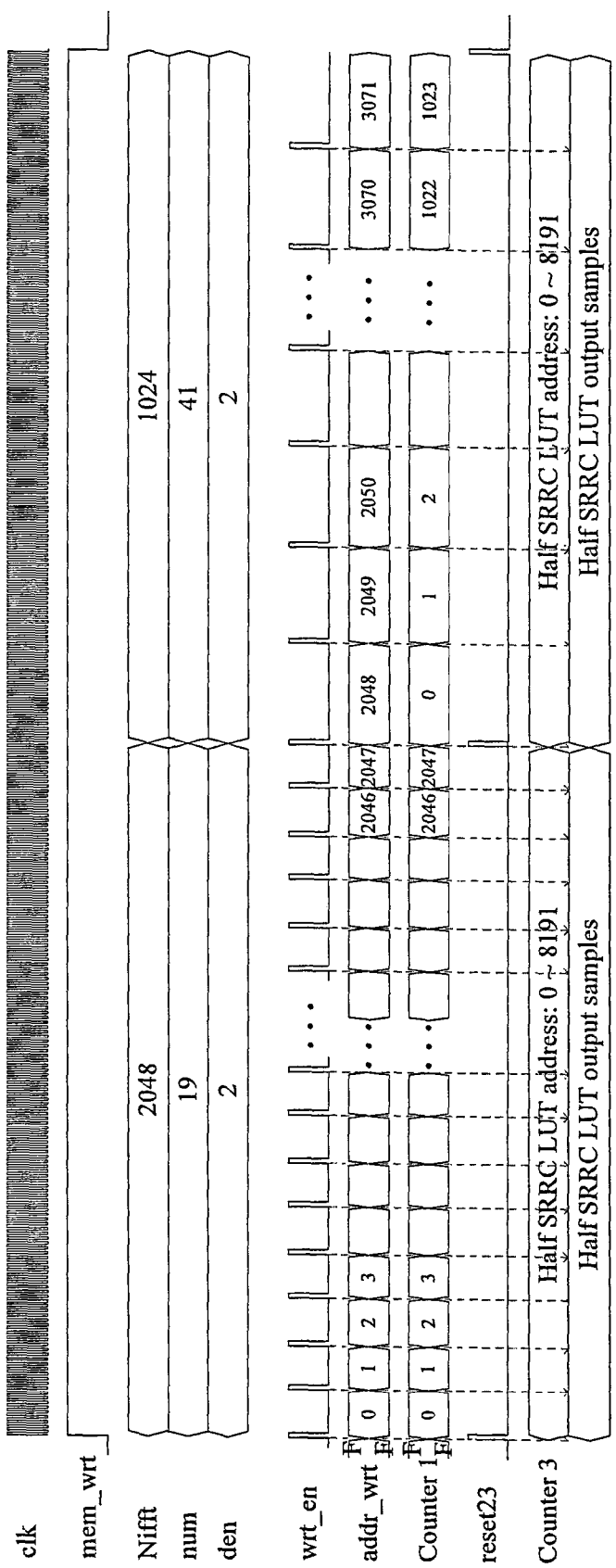
FIG. 14 is a timing diagrams for loading MF coefficients using an exemplary implementation structure.
Figure 15:
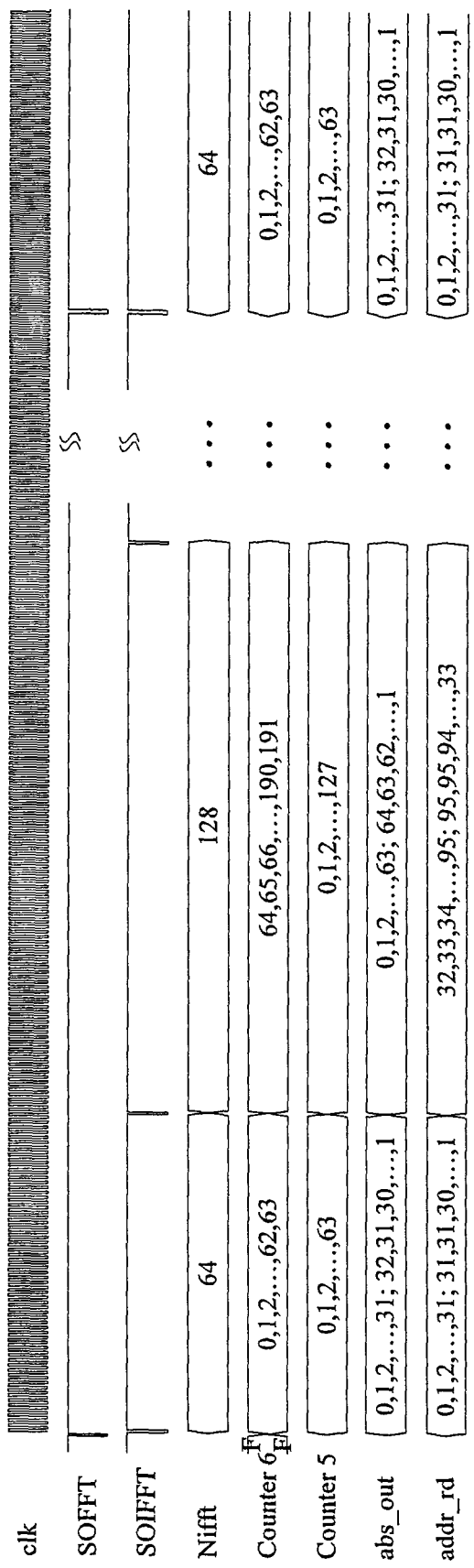
FIG. 15 is a timing diagrams for reading MF coefficients using an exemplary implementation structure.

FIGS. 14 and 15 show timing diagrams for loading and reading MF coefficients. The rate converter 123 may be shared by all channels. The conversion ratio may be, for example, determined by the channel symbol rate. The input sample rate of the converter is 1.5 to 3 samples per symbol and the output sample rate is always 4 samples per symbol.

The rate converter 123 may be a Piecewise Parabolic Interpolator (PPI) to be implemented in the Farrow structure according to an embodiment of the invention. For an exemplary timing adjustment Farrow filter, the input and output are at the same sampling rate. A Farrow rate converter, however, is a multi-rate filter with different input and output sample rates. The μ value in this case is a periodic sequence given using the following equation:

$$\mu_n = \frac{\langle n \cdot M \rangle_L}{L}, n = 0, 1, 2, 3, \ldots ,$$ Equation 24 where M is the decimation factor and L is the interpolation factor. The period of the μ sequence is the least common multiple of M and L.

Figure 16:
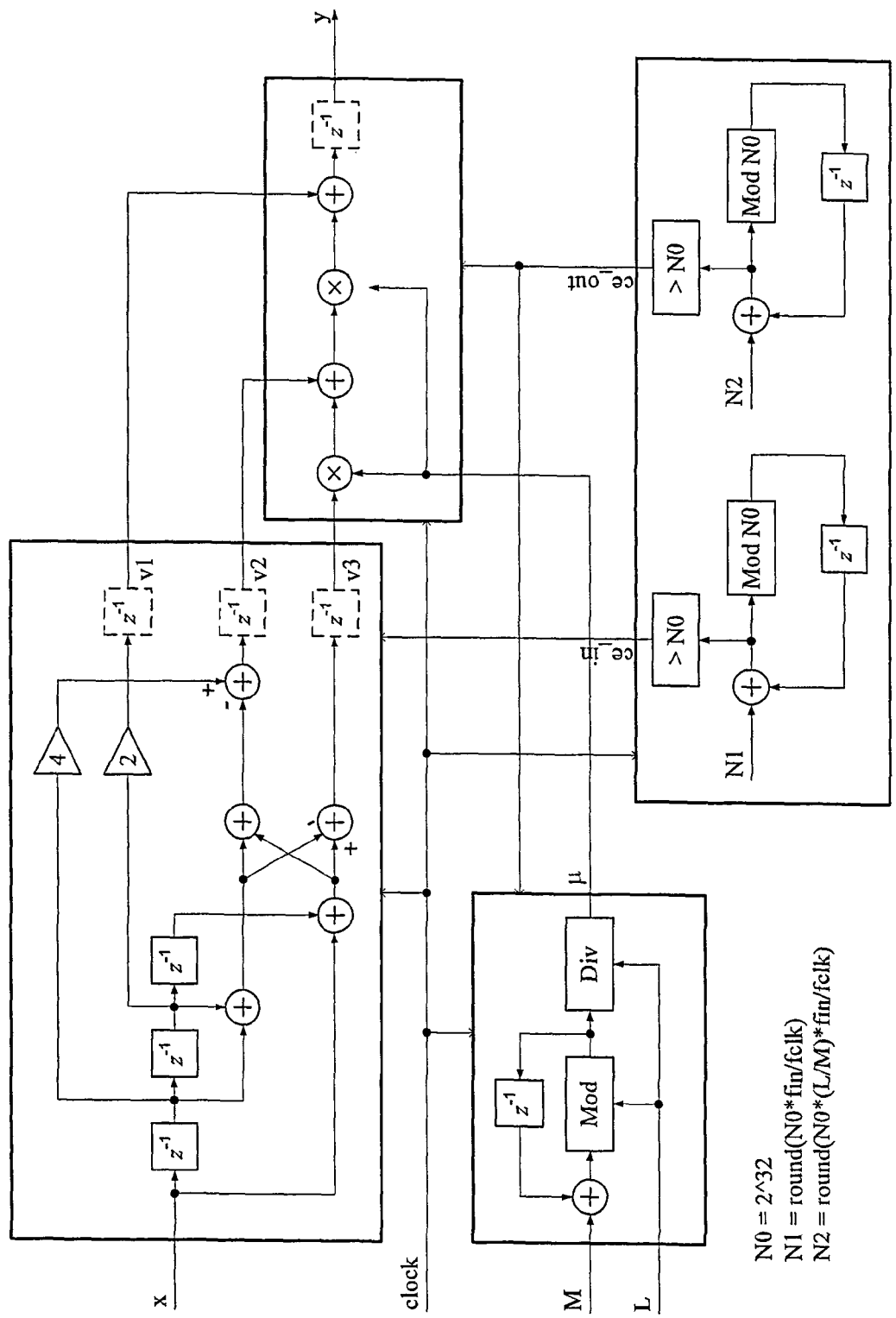
FIG. 16 is a block diagram a Farrow rate converter according to an exemplary embodiment.

FIG. 16 shows an implementation of a Farrow rate converter according to an embodiment of the invention. In this embodiment a clock rate is selected that is not lower than the highest sample rate of the input sample rate and the output sample rate.

The input samples are fed into the structure at the input sample rate through input clock enable ('ce_in'). Similarly, the output samples are produced from the structure through output clock enable ('ce_out'). These two clock enable signals are generated locally according the conversion ratio (L/M). The μ signal is a function of L and M and it should be ideally generated locally in real time.

Figure 17:
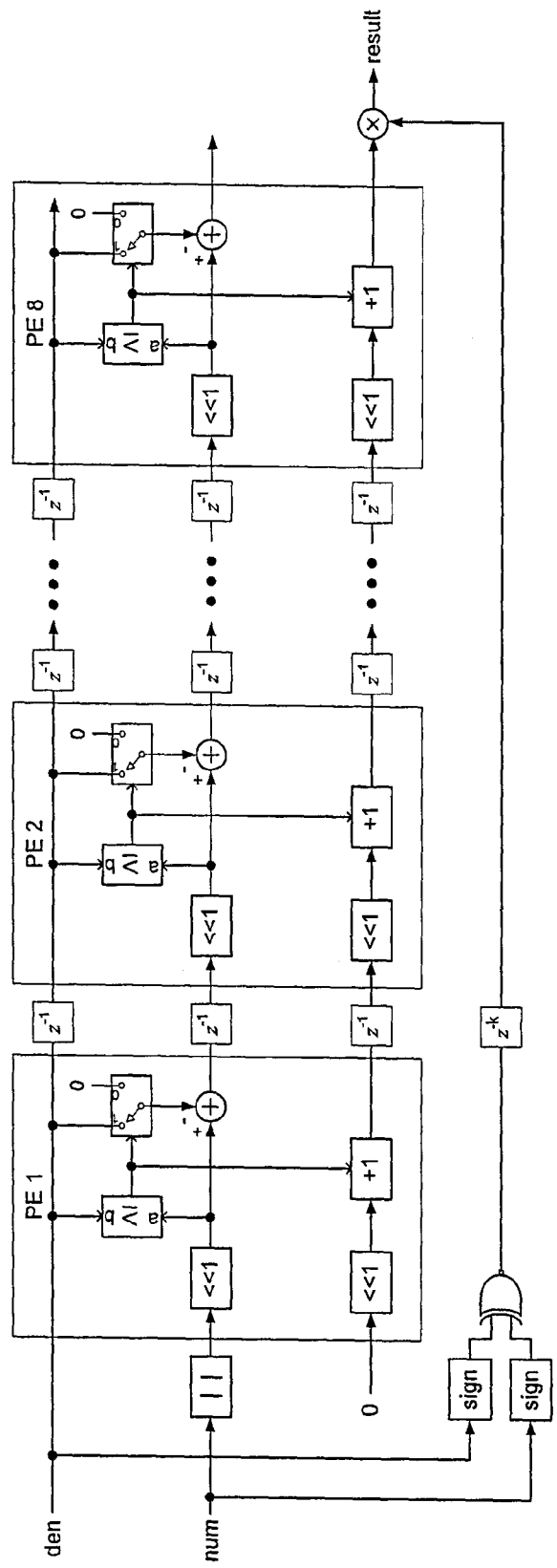
FIG. 17 is a block diagram of a long division divider according to an exemplary embodiment.

FIG. 16 is a block diagram of a divider running at the output sample rate according to an embodiment of the invention. The divider can be implemented based on a long division algorithm. FIG. 17 shows an exemplary long division divider structure according to an embodiment of the invention, and FIG. 18 shows the associated Matlab code implementing the exemplary long division algorithm.

Figure 19:
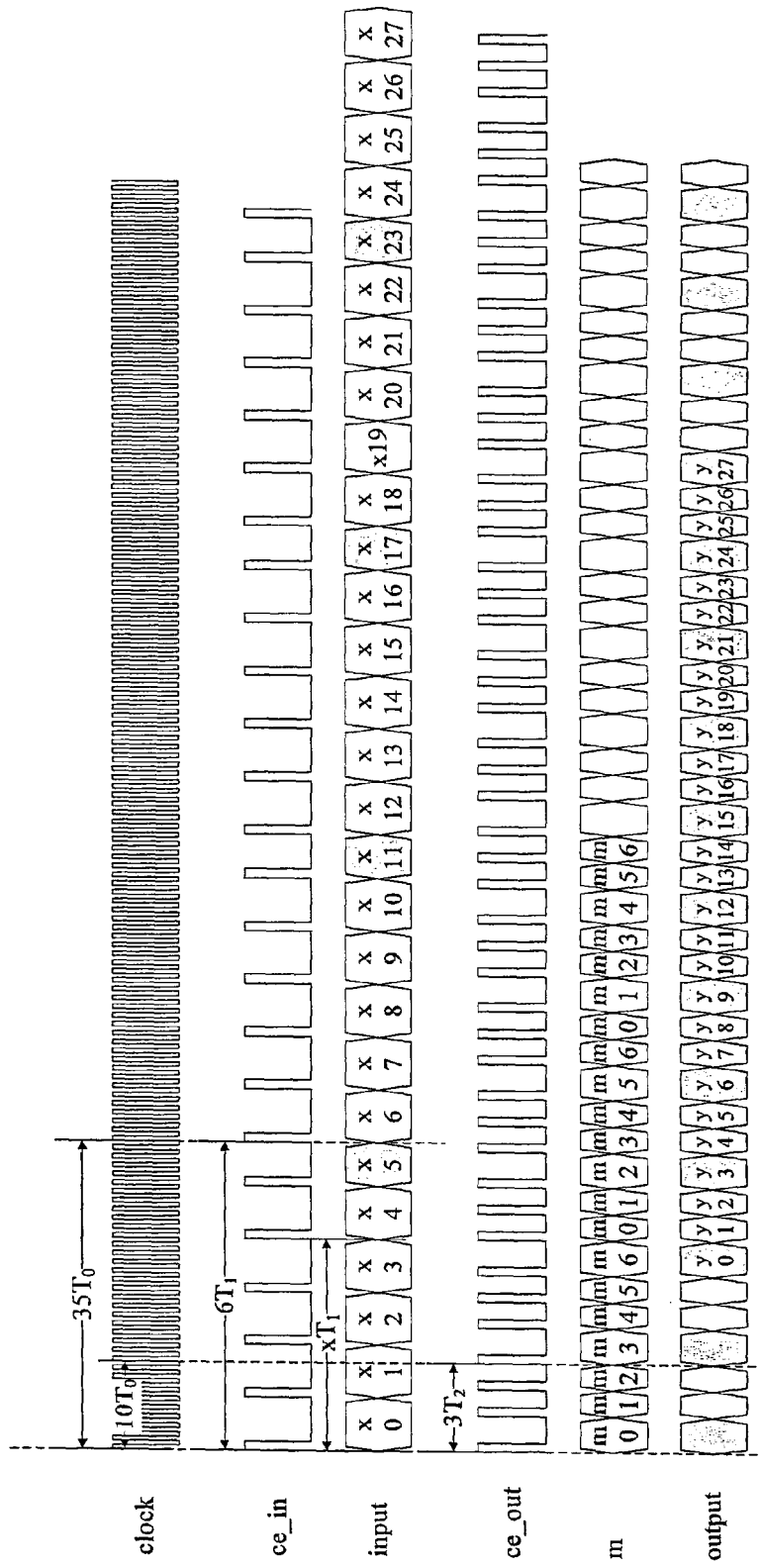
FIG. 19 is a timing diagram of the relationship between input, output, and control signals of the single clock Farrow rate converter according to an exemplary embodiment.

FIG. 19 shows the timing relationship between input, output, and control signals of the single clock Farrow rate converter. In this example, a timing diagram for L=7 and M=4 is used. Incorrect timing may lead to poor image rejection performance of the interpolator.

FIG. 20 shows an exemplary short test vector for the timing relationship example provided by FIG. 19.

The frequency correction block 124 removes the residual frequency errors introduced by the finite frequency resolution of the FFT/IFFT filtering. Since the nominal carrier center frequency is previously known, the residual frequency error is therefore deterministic. A conventional Direct Digital Synthesizer (DDS) that creates complex sinusoidal waveforms used for frequency correction. The DDS block may also be shared by all channels according to an embodiment of the invention.

As discussed above, the digital channelizer 102 distributes a multicarrier signal into separate carriers, or channels, through a FFT and a number of IFFTs. With a hardware-efficient DSP architecture, according to an embodiment of the invention, the digital channelizer 102 outputs the frequency-demultiplexed channel signals in a time-multiplexed manner for each FFT block, whereas the TDMA-Demodulator 106, which is shared by all channels, expects burst-by-burst time-multiplexed channel signals.

If the TDMA-Demodulator 106 is used to process block-by-block TDM signals directly, it has to store the demodulated/decode states (as well as some internal signals) of the currently unfinished channel burst and to retrieve the previous demodulated/decode states for the incoming block of another channel. Depending on the number of carriers in a MF-TDMA signal, the switch over of state/internal signal storing and retrieving may occur a number of times in a FFT block interval, which may lead to significant reduction of processing efficiency and throughput, not to mention increased complexity and feasibility for non-homogenous ATDMA traffic or for large number of channels.

That problem may be overcome according to an embodiment of the invention that uses a burst reconstruction buffer (BRB) 202 to convert the block-by-block TDM of the digital channelizer 102 output to a burst-by-burst TDM signal before feeding it to the TDMA-Demodulator 106. Proper scheduling for the TDMA-Demodulator 106 to respond to the 'Process Request Queue' 204 may optimize the throughput and buffer-size performance.

The digital channelizer 102 interface using the BRB 202 allows the TDMA-Demodulator 106 to maximize its throughput and, more importantly, it allows the digital channelizer 102 to accommodate non-homogenous time-frequency plans as well as support Adaptive TDMA (ATDMA).

Figure 21:
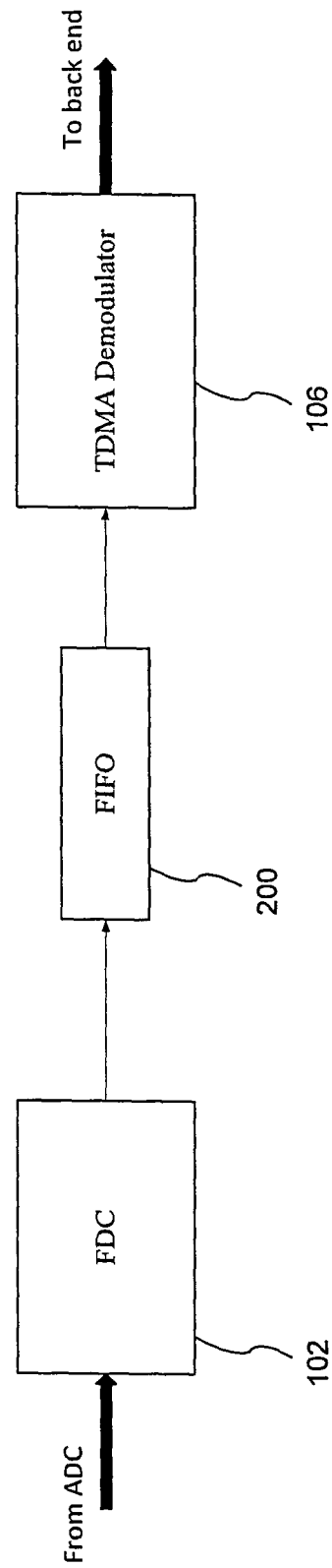
FIG. 21 is a block diagram according to an exemplary embodiment.

A conventional system may include a direct connection interface between the digital channelizer 102 and the TDMA-Demodulator 106 for each FFT block, passing data blocks of different channels sequentially from the digital channelizer 102 to the TDMA-Demodulator 106 through a simple FIFO 200 as illustrated, for example, in FIG. 21. Since the FIFO output is a muxed multichannel signal which is serialized on a (FFT) block-by-block basis, instead of processing TDMA bursts a burst a time, the TDMA-Demodulator 106 in this conventional arrangement may need to process a burst in several chunks. When this happens, all states and intermediate signals of unfinished channels need to be saved before switching to processing a current incoming channel data block and restoring states and signals of the current channel. This conventional approach may work adequately for a homogenous in-rout group (i.e., all carriers have the same symbol rate and MODCOD) and for small number of channels. However, for situations of non-homogenous in-rout groups and ATDMA or with a large number of channels, the above conventional scheme becomes very difficult (if not impossible) to implement.

Figure 22:
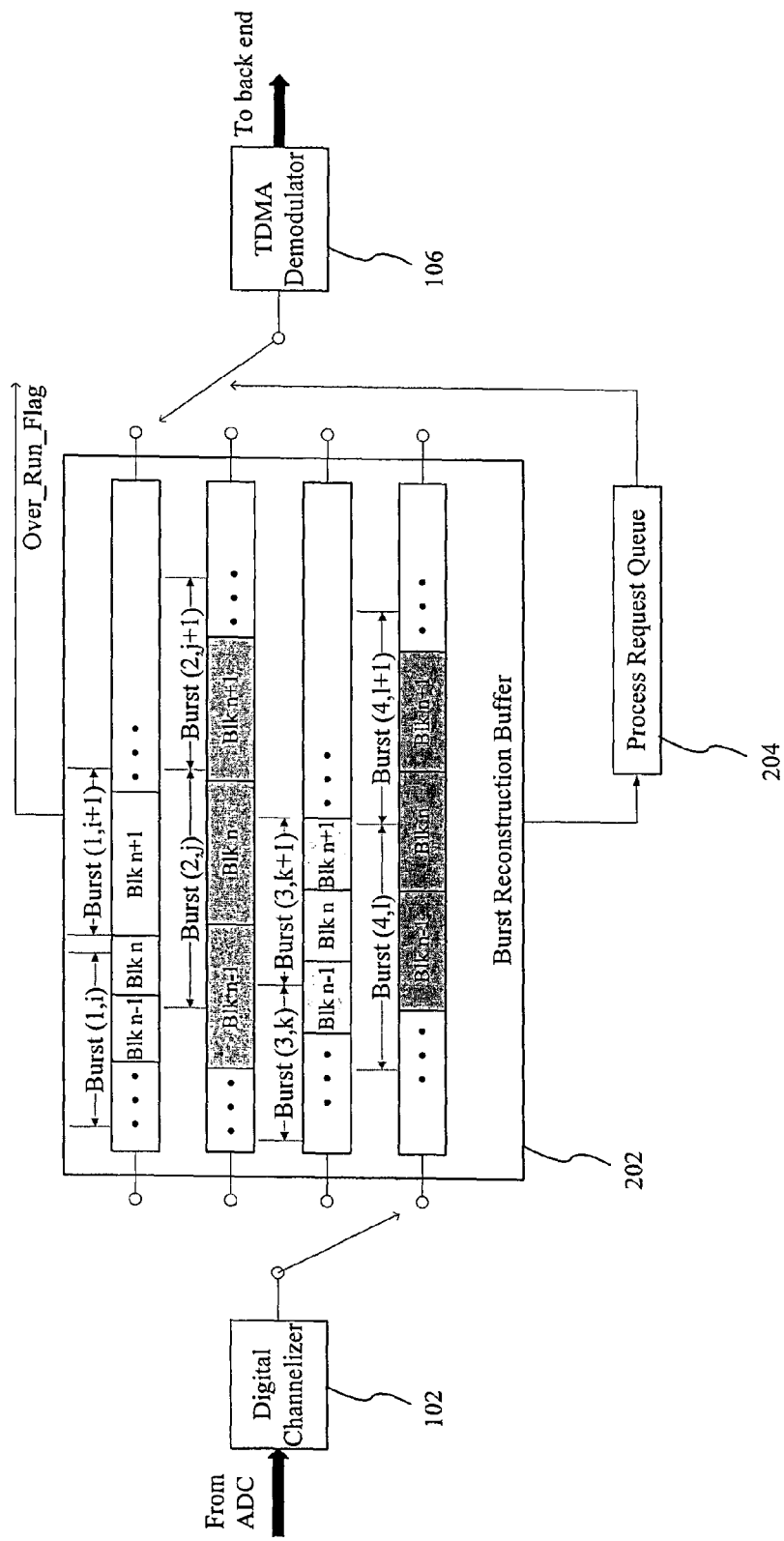
FIG. 22 is a block diagram of a burst reconstruction buffer according to an exemplary embodiment.

To accommodate non-homogenous and ATDMA traffic, an embodiment according to the invention replaces the simple FIFO 200 with BRB 202. An embodiment of BRB 202 is shown in FIG. 22. The BRB 202 of this embodiment includes a bank of independent channel buffers, with one buffer for each channel. As the digital channelizer 102 processes overlapped FFT blocks continuously, for each FFT block, the digital channelizer 102 generates one data block for each channel. In a non-limiting example, the size of the channel data block may be (3L/4M)*Nifft samples (or (3L/8M)*Nifft symbols), where L is the interpolation factor and M is the decimation factor, of the Farrow filter to convert 2~4 s.p.s. of IFFT output to 2 s.p.s. For each FFT block, the digital channelizer 102 will sequentially send channel data blocks to corresponding channel buffers.

Each channel buffer within the BRB 202 has a counter that counts how many unprocessed channel samples stored in the respective buffer and a pointer that points to the oldest unprocessed sample (which is also the start of a burst). When the counter exceeds the burst length of the channel, a processing request is sent to the 'Process Request Queue' 204. If the TDMA-Demodulator 106 responds to the processing request, immediately or sometimes later depending on the status of the queue, the TDMA-Demodulator 106 will read a complete burst from this channel buffer for demodulation and decoding. The counter and the pointer will be updated accordingly.

The depths of all channel buffers are identical and it may be determined by the worst case scenario where the highest and lowest symbol rates and longest and shortest bursts coexist. The BRB 202 may also include an over-run detection logic feature according to another embodiment of the invention. For example, if the counter of any of the channel buffers reaches the depth of the buffer, the 'Over_Run_Flag' may be set to 'high'.

A Process Request Queuing method according to embodiments of the invention, can include "first-come first-served" or, alternatively, may add an additional criterion that also considers the fullness of the channel buffers, i.e., the channel with the fullest channel buffer will be served first. The later approach may advantageously avoid over-run with relatively smaller buffer sizes.

The digital channelizer 102 according to an embodiment of the invention may make it possible for plural types of channel filtering in the frequency domain. In addition to performing matched filtering as discussed above, the digital channelizer 102 can also be used to un-do group delay/gain variation (over frequency) type of linear distortion on a channel-by-channel basis.

Unlike conventional time-domain or frequency-domain linear distortion equalizers that lack flexibility (as in time-domain methods where a specific infinite impulse response (IIR) filter may be designed for given group delay and gain profiles) and/or are difficult to share between different channels, the multi-channel equalization in the digital channelizer 102 provides an extremely flexible method and much of the hardware for equalization can be shared by all channels.

Frequency-domain channel filtering may also be used according to an embodiment of the invention to achieve a flexible and low complexity multi-channel linear distortion equalizer. With both FFT and IFFT engines included in the digital channelizer 102, all channel equalizers can effectively share the same FFT and time-share a common IFFT engine.

To further reduce the complexity of the multi-channel equalizer, equalization coefficients which are calculated offline for given group delay and gain profiles are combined with the frequency-domain MF coefficients according to an embodiment of the invention so that matched filtering and linear distortion equalization are performed at the same time.

The frequency domain channelization according to an embodiment of the invention also provides flexibility to allow arbitrary frequency plans of multicarrier signals, and allows arbitrary linear filtering to any of the channels in frequency domain by spectral shaping of channel signals at IFFT input. This advantages result, in part, from performing the SRRC matched filtering in the frequency domain. The spectral shaping feature of an embodiment of the invention further assists in reducing linear distortions, namely group delay and spectral flatness issues, that are caused by the transmission and receiving of analog chains and RF filters.

To perform linear distortion equalization according to an embodiment of the invention, we assume that the linear distortion is relatively static and the group delay and gain flatness profiles are either known or can be estimated through a conventional estimation/calibration process.

Figure 23:
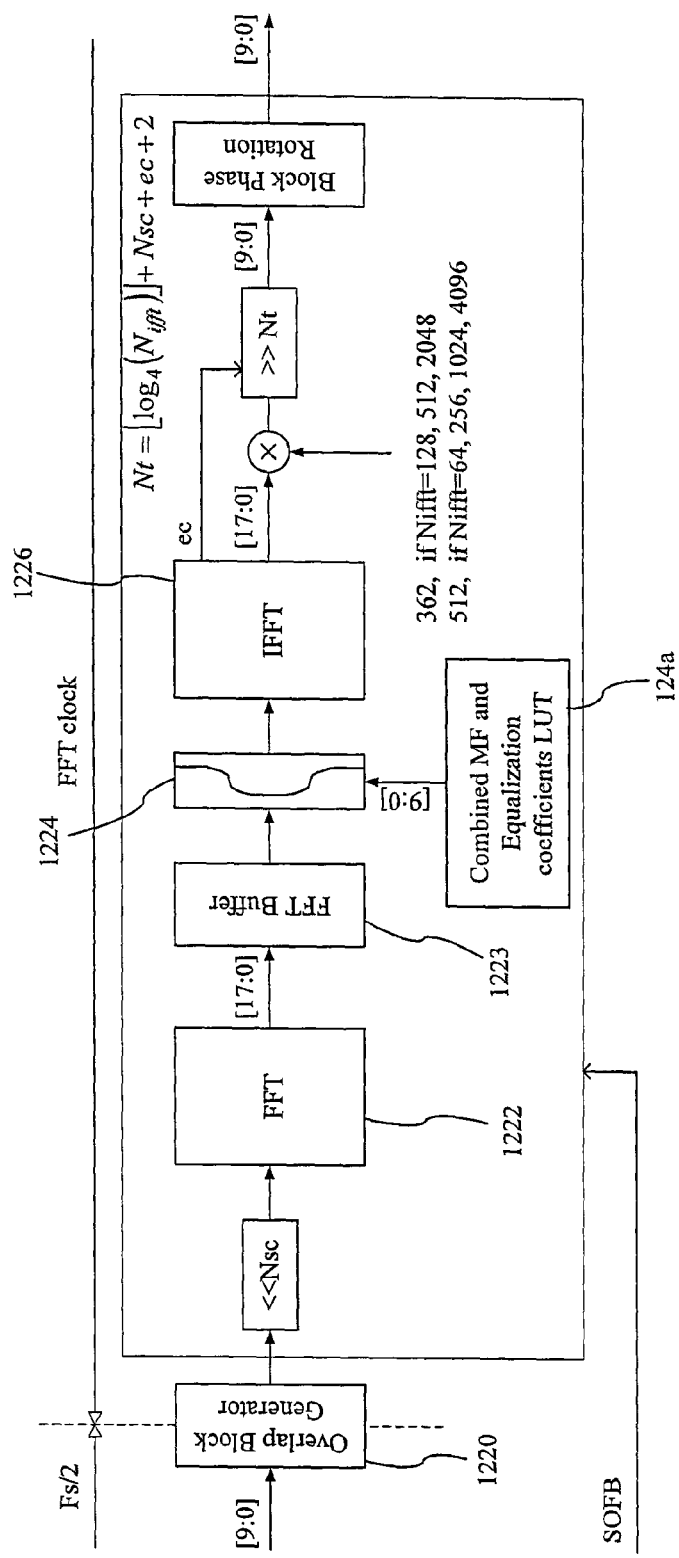
FIG. 23 is a block diagram of a digital channelizer implementing combined MF and equalization coefficients according to an exemplary embodiment.

Once the group delay and gain flatness profiles for a channel (carrier) are available, a set of complex equalization coefficients can be calculated and generated offline. The equalization coefficients can be applied separately before (or after) the frequency domain MF or, as shown in FIG. 23, they can be combined with the MF coefficients and applied once to the IFFT input for spectral shaping. The coefficients for the linear distortion equalization may be stored in a LUT, such as the LUT used to store the MF coefficients. In this example, the LUTs for the linear equalization coefficients and the MF coefficients are stored in the combined MF and equalization coefficient LUT 124*a*.

Figure 24:
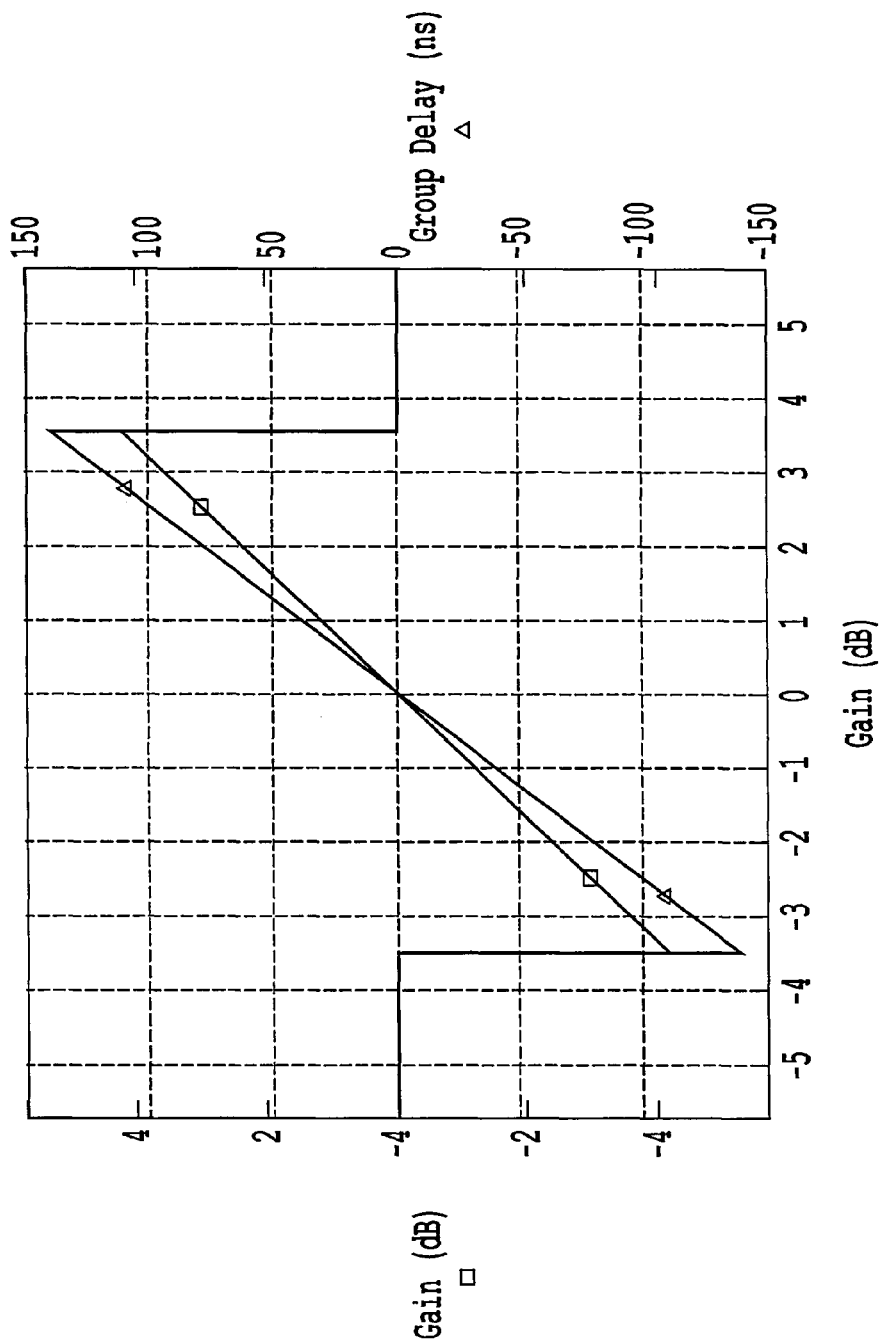
FIG. 24 is a graph of an example of an extreme case of linear distortion according to an exemplary embodiment.

FIG. 24 is a graph of linear distortion for an extreme case with 1.2 dB/MHz gain tilt and 40 ns/MHz group delay. In this example, the linear distortion is applied to a 5 Mbaud QPSK carrier that is centered at the upper edge of a 15-carrier frequency plan. In channelization, this carrier will be retrieved by the digital channelizer 102 as channel 15 and the IFFT size for this carrier is 2048. To equalize the effects of linear distortion, the frequency MF coefficients are combined with the pre-calculated 2048 complex equalization coefficients.

Figure 25:
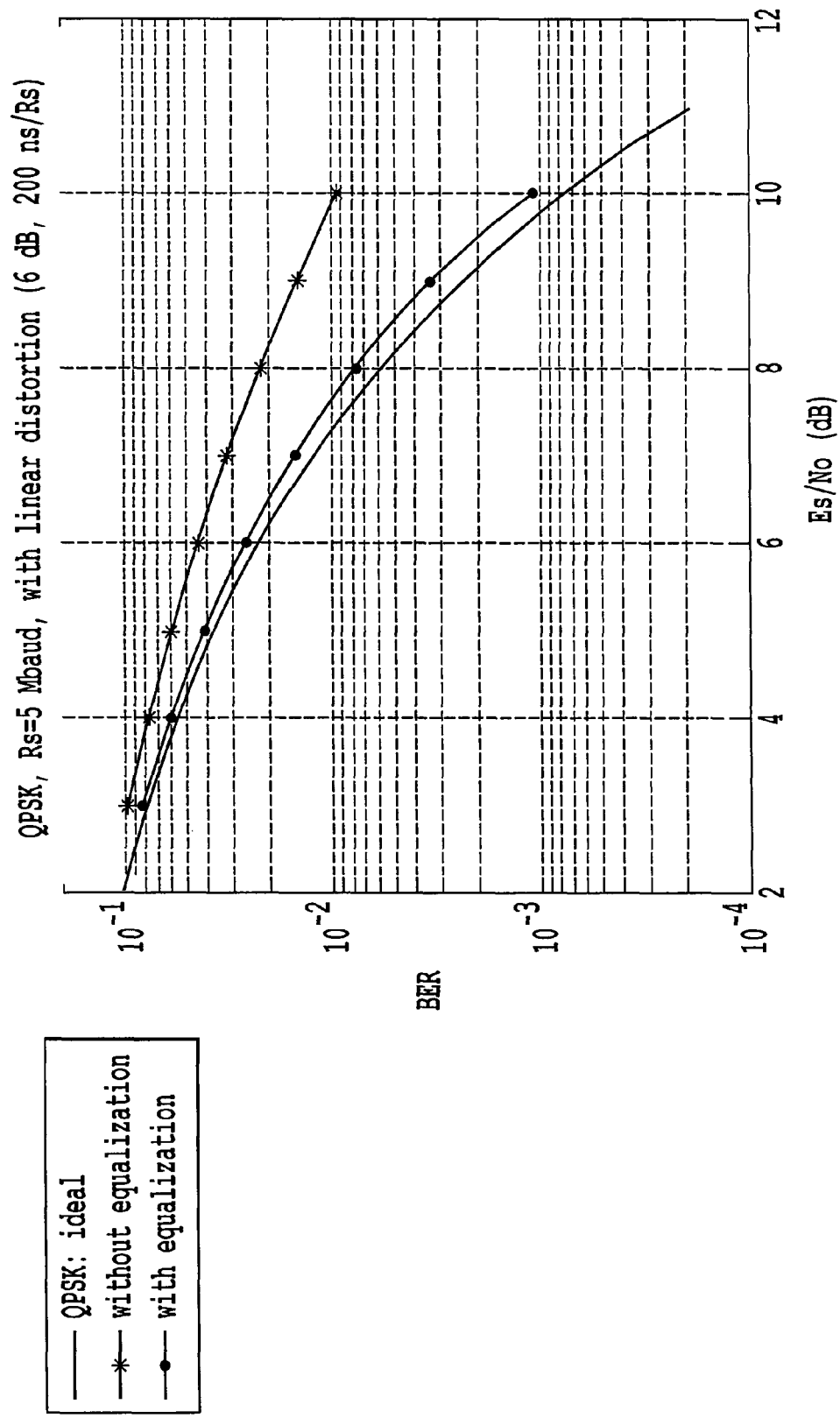
FIG. 25 is a graph of un-coded bit error rate curves with and without linear distortion equalization according to an exemplary embodiment.

FIG. 25 is a plot of un-coded bit error rate (BER) curves with and without linear distortion equalization in the frequency range showing the effectiveness of the inventive linear distortion equalization. In terms of digital channelizer 102 complexity, there is only marginal increase in digital channelizer 102 complexity when equalization is enabled through this inventive approach. The increase is due to the change of from complex-by-real to complex-by-complex multiplication in spectral shaping.

The following discussion describes MCD-TDMA receiver initial gain setting for the multicarrier channelization and demodulation apparatus using two inventive methods introduced below. Embodiments according to the two new methods may speed up remote acquisition time by reducing gain sweeping time or eliminating the gain sweeping completely. These two methods may also be used for other applications as well, such as signal RMS estimation, overflow detection, and C/N estimation, etc. . . .

According to one type of conventional gain sweeping, a controller may periodically send an automatic gain control (AGC) gain value that is stepping up and down in a specified range to a line card that transmits a downstream signal and has only one single channel or multichannel TDMA demodulator to process the MF-TDMA upstream. Depending upon throughput requirements a hub may include one or more line cards. If a traffic burst from a remote is successfully detected and demodulated (which usually follows successful detections of some ACQ bursts), the sweeping value is remembered as the good R/x AGC value and the gain sweeping ends. An ACQ (acquisition) burst is transmitted by a remote at a predefined time window in a frame. The ACQ burst carries some basic information about the remote. The purpose of the ACQ burst is for a remote to acquire the network. Once the ACQ burst is detected and demodulated by the hub, the remote may be assigned some time slots to transmit traffic bursts in the next or later frames.

Conventional systems using this gain sweeping method may have at least two problems. The first problem with the conventional approach is that the time required for the sweeping process to hit a proper R/x AGC value that, in turn, leads to a successful detection and demodulation of a traffic burst could be very long. It can be even more problematic when remote receivers experience frequent dropouts. A second problem with the conventional approach is that the sweeping gain may settle at a high gain that, though it leads to successful detection and demodulation of a traffic burst, may cause saturations in a correlator. A correlator is the first functional block after the matched filtering in a TDMA demodulator. Its main purpose is to detect the presence of a burst usually through unique word correlation and to determine the start of the burst as well as the symbol timing error. Such saturation could put the close loop gain control to a positive feedback causing even more severe saturation by increasing the digital gain (because saturation may decrease the correlation peak value making it lower than the target level).

Two inventive initial gain setting methods are described below that do not require gain sweeping, and embodiments according to these methods may allow the digital gain to settle down to a proper value in an advantageously short time.

A method of overflow/underflow detection and RMS estimation of channelized signals according to an embodiment of the invention is described below. When used in the frequency-demultiplexed channels at digital channelizer 102 output, the method of overflow/underflow detection and RMS estimation of channelized signals provides for detection of channel activity by indicating whether there is or is not burst transmission and transmission interval over the channel in a frame or in any given time intervals, differentiation of certain burst types (e.g., ACQ vs. traffic burst) with proper selection of the moving average time constant, estimation of an instantaneous carrier-to-noise (C/N) ratio of the channel when there is sufficient silent period, and the assisting with burst detection of channel activity information and estimated C/N to significantly reduce the probability of false detection (which, particularly in low C/N environment, can be very high with current correlation-based burst detection method). This method can also be used for purposes similar to those listed above in other fields and applications with either continuous or bursty transmissions.

For an exemplary Overflow/Underflow Based Initial Gain Setting method, the following assumptions are made: there is a per channel gain setting at IFFT input, gain measurement is done in time domain at either IFFT output (at 2~4 sps) or Farrow filter output (at 2 sps), initial gain setting will be done only during acquisition (i.e., the channel signal is silent during a frame except for ACQ burst time), the maximum C/N is 30 dB, and the analog AGC controls signal level of ADC input so that ADC output is always 2 bits back off from full scale.

The operation of the overflow/underflow based initial gain setting method is explained with reference to a definition of overflow and underflow. For an N-bit digital signal, there is an overflow if any sample reaches or exceeds the full scale values $-2^{(N-1)}$ and $+2^{(N-1)}-1$. To simplify the problem, there is overflow if the absolute value of any of its samples reaches or higher than $+2^{(N-1)}-1$. Similarly, the underflow condition is defined as occurring when the absolute values of all signal samples are below $2^M$, where M<<N. In the context of this overflow/underflow based initial gain setting method, the definition of overflow and underflow are further generalized by defining an overflow bit (bit_ovf<N) and an underflow bit (bit_unf<bit_ovf) such that overflow is declared if ratio $$\frac{N_{ovf}}{N_{tot}} > P_{ovf_{tolerance}} \qquad \text{Equation 25}$$

and underflow is declared if ratio $$\frac{N_{unf}}{N_{tot}} > P_{unf_{tolerance}} \qquad \text{Equation 26}$$

where $P_{ovf\_tolerance}$ is the overflow tolerance level, $P_{unf\_tolerance}$ is the underflow tolerance level, $N_{ovf}$ is the number of overflow samples whose absolute values are ($2^{bit\_ovf}-1$) or larger, $N_{unf}$ is the number of underflow samples whose absolute values are less than $2^{bit\_unf}$, and $N_{tot}$ is the total number of samples in a window.

Figure 30:
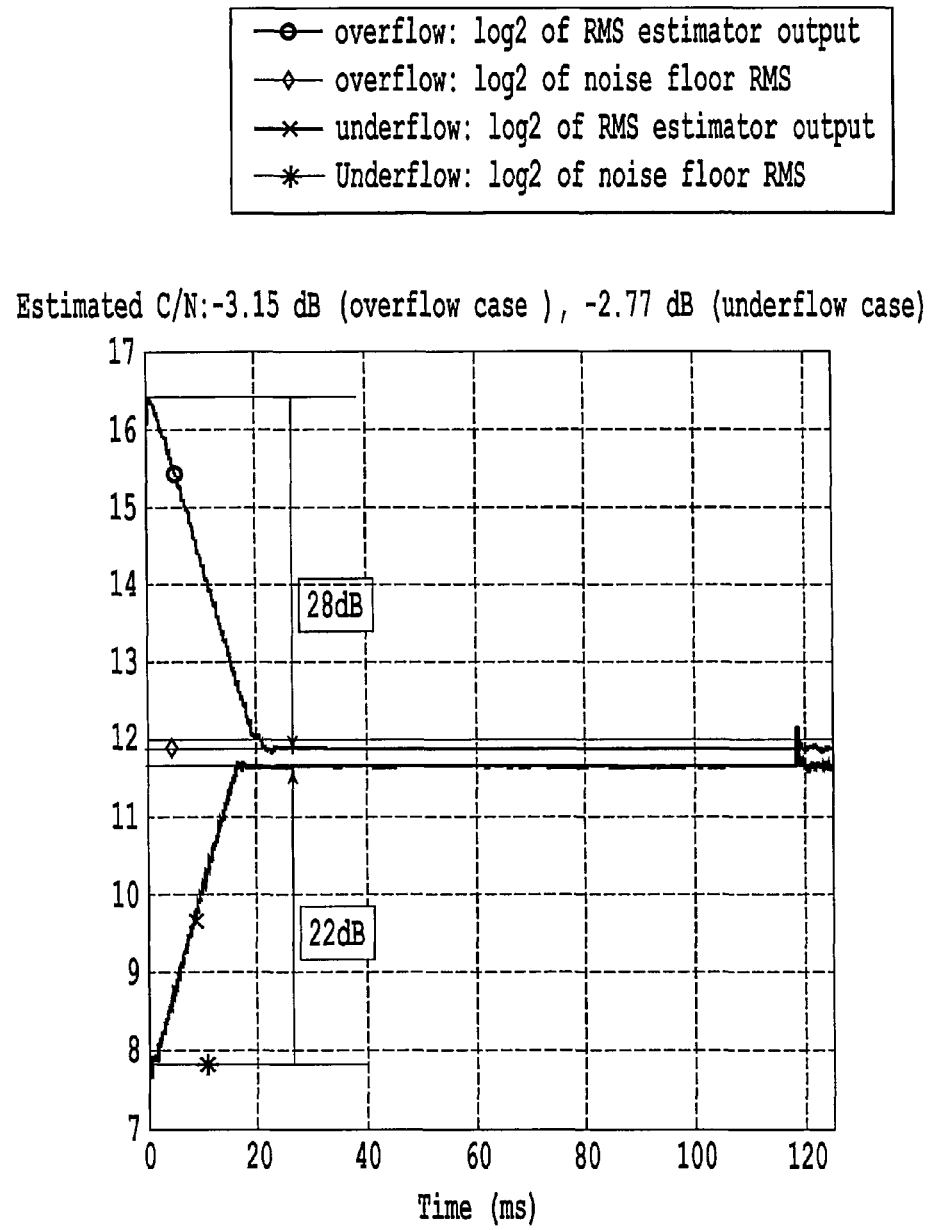
FIG. 30 is a graph of a profile of the estimated RMS for low SNR cases according to an exemplary embodiment.

According to one embodiment of the invention, the output of an overflow detector is the 'step-down' strobe that goes high (logic '1') if an overflow condition is declared. The overflow condition is not necessarily determined based on single event of one overflowed sample value (>2^bit_ovf−1), and instead the overflow condition may be determined by comparing the average number of overflowed samples in the moving average window with an overflow threshold TH ovf, which is about 17 for an overflow tolerance threshold=1e-6 and the exponential average accumulator bit width Nb_acc=24 bits, as shown in the example of FIG. 30.

According to one embodiment of the invention, the output of an underflow detector is a 'step-up' strobe that goes high (logic '1') if an underflow condition is declared. The underflow condition may not be determined based on a single event of one underflowed sample value (<2^bit_unf), and is instead preferably determined by comparing the average number of underflowed samples in a moving average window with the underflow threshold TH_unf, which is about 16609443 for underflow tolerance threshold=0.99 and the exponential average accumulator bit width Nb_acc=24 bits, according to Equation 31.

For tighter control of overflow, according to an embodiment of the invention, the overflow tolerance can be set to a very small value (e.g., $P_{ovf\_tolerance}$=1e-6). To relax the underflow control, the underflow tolerance can be set to a large value less than or equal to 1, for example 0.99 (as an extreme case, setting $P_{unf\_tolerance}$=1.0 meaning that underflow will never be declared no matter how small the signal values are and what 'bit_unf' is selected). When the tolerance threshold is set to 1.0, it basically disables the underflow detection and the 'step-up' strobe will never goes high (unless the detector input is all zeros). In a non-limiting example, to have a tighter control of the initial gain and hence a narrower overflow/underflow-free range, bit_unf=bit_ovf−1.

The selection of 'bit_ovf' depends roughly on how much the desired noise RMS to be backed off from the full scale. Under AWGN assumption, the noise RMS value may be about 12 dB backed off from $2^{bit\_ovf}$, or (N-bit_ovf)*6.02+12 dB from full scale. Let $PAR_{sig}$ be the peak-to-average ratio of the baseband signal waveform (e.g., 2.1 for QPSK) and $PAR_{noise}$(≈4) be the peak-to-average ratio of noise, the maximum C/N that this scheme can handle is determined using the following equations:

$$SNR_{max} = 6.02(N - bit_{ovf}) - 10\log_{10}\left(\frac{PAR_{noise}}{PAR_{sig}}\right) \text{ (dB)} \qquad \text{Equation 27}$$

or, $$bit_{ovf} = N - \frac{1}{6.02}\left(SNR_{max} + 10\log_{10}\left(\frac{PAR_{noise}}{PAR_{sig}}\right)\right) \text{ (bit)} \qquad \text{Equation 28}$$

$$bit_{unf}=bit_{ovf}-1 \qquad \text{Equation 29}$$

According to an embodiment of the invention, the method for overflow and underflow directed gain control does feedback control of the channel gain by stepping up or down the channel gain according to overflow and underflow conditions. The gain control loop may be closed only for a short period of time (e.g., a fraction of a frame) to allow the digital gain to settle down to a narrow range (e.g., <6 dB, the actual range depending on the selection of overflow and underflow bit locations as well as on the step size of gain adjustment) where there is no overflow and underflow.

With an additional exponential average block, the RMS values of the noise and signal plus noise can be estimated. These values can then be used to calculate the C/N of the channel signal. The equivalent average window size of the RMS estimator will be switchable between a long (e.g., 8×Nw, where Nw is the window size used by the overflow/underflow detector) and a short (i.e., Nw) size to reduce the estimation variance of noise RMS. The RMS value of the signal plus noise is roughly the maximum value of the estimator output during the aperture window period. To allow the estimator to reach the peak RMS value, the equivalent window size has to switch to Nw at the start of the aperture window.

Embodiments of the inventive method discussed above may work with both wideband and narrowband continuous or bursty signals.

Figure 26:
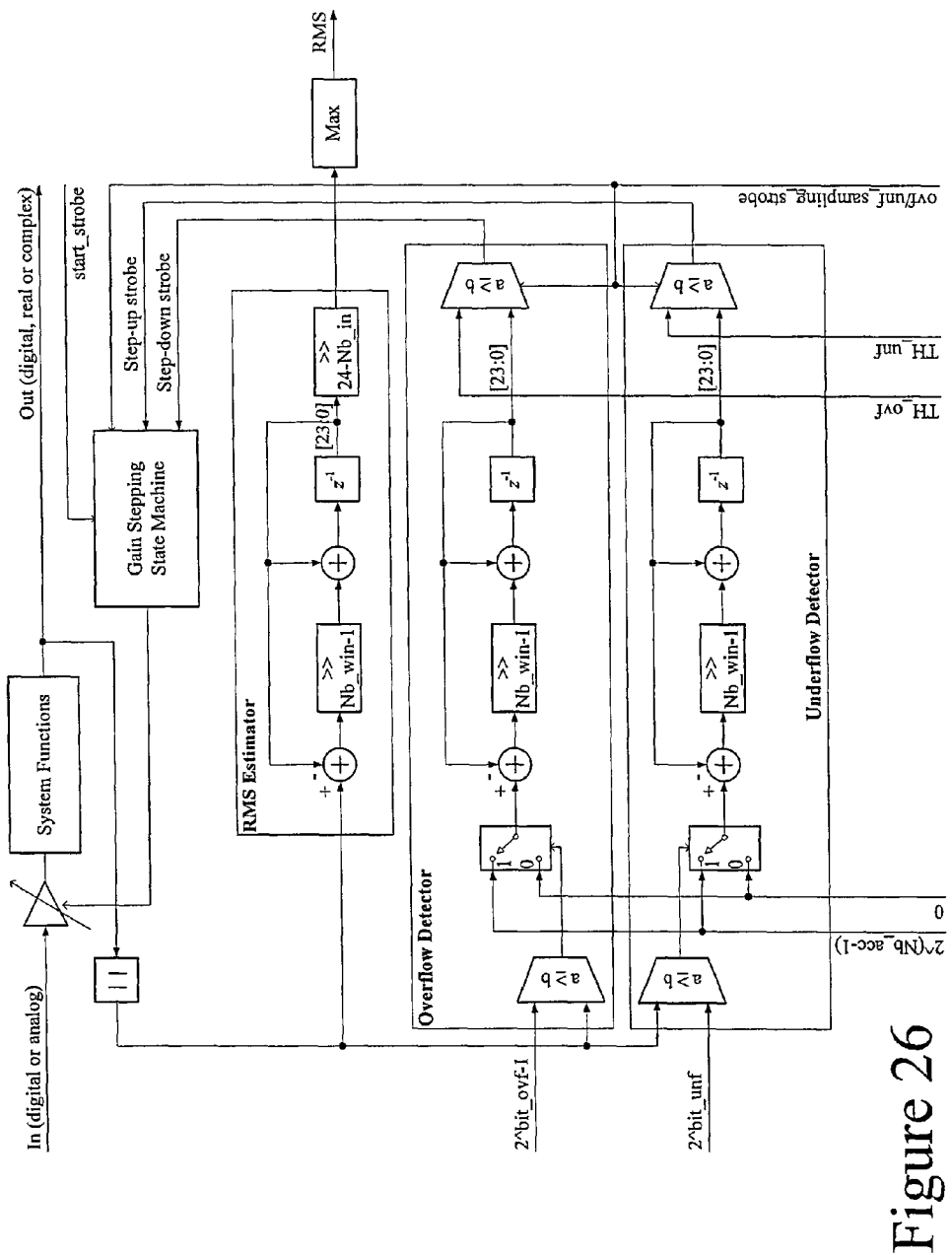
FIG. 26 is a block diagram of an overflow and underflow directed gain control detector according to an exemplary embodiment.

FIG. 26 shows a block diagram of overflow and underflow directed gain control section according to an embodiment of the invention. The gain control of the embodiment can be performed in the analog or digital domain. In an exemplary MCD initial gain setting, the channel gain control is at IFFT input and it is shared by all channels. In FIG. 26, the block labeled "System Functions" includes an IFFT or other functions, depending upon the embodiment, such as one or more linear digital filters, channelizer, buffer/FIFO, Farrow rate converter, and/or a residual frequency error correction block.

The overflow detector in this embodiment includes an overflow event detector that generates a strobe whenever an input sample overflows or reaches the full scale, an overflow strobe average filter, and an overflow threshold comparator. The overflow comparator will generate a gain stepping down strobe at a gain adjustment time if the overflow average filter output is greater than a pre-defined overflow threshold ($TH_{ovf}$), which is determined by $$TH_{ovf} = \lfloor P_{ovf_{tolerance}} * 2^{N_{b_{acc}}} \rfloor \qquad \text{Equation 30}$$

where $\lfloor . \rfloor$ is the flooring function and $N_{b\_acc}$ is the bit-width of the accumulator.

Similarly, an underflow detector according to an embodiment of the invention may include three modules: an underflow event detector that generates a strobe whenever an input sample is below certain magnitude (i.e., underflows), an underflow strobe average filter, and an underflow threshold comparator. The underflow comparator generates a gain stepping up strobe at a gain adjustment time if the underflow average filter output is greater than a pre-defined underflow threshold ($TH_{unf}$), which is determined by $$TH_{unf} = \lfloor P_{unf_{tolerance}} * 2^{N_{b_{acc}}} \rfloor \qquad \text{Equation 31}$$

The criterion that the gain adjust process converges is when there is no gain stepping up and stepping down strobes for at least 4 consecutive gain adjustment periods at the overflow and underflow detector outputs.

Figure 27:
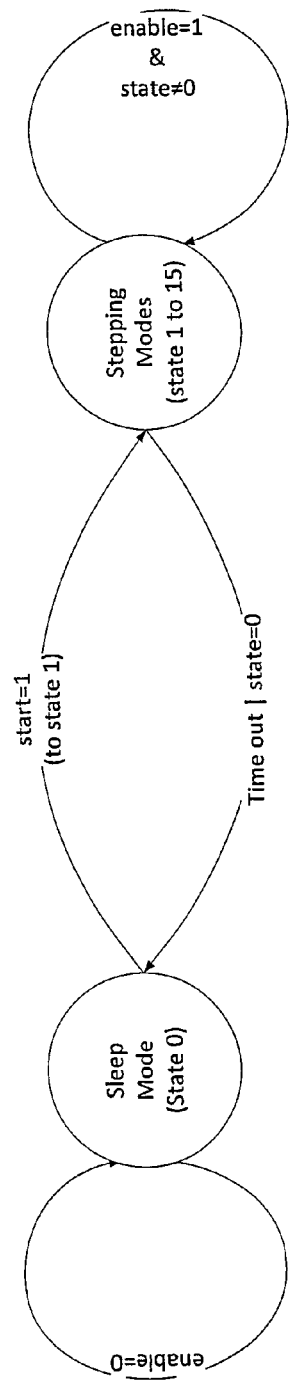
FIG. 27 is a state diagram of an initial gain setting method according to an exemplary embodiment.

FIG. 27 is a state diagram according to one embodiment of the invention. The definition of an exemplary stepping state is shown in FIGS. 28A and 28B.

Figure 29A:
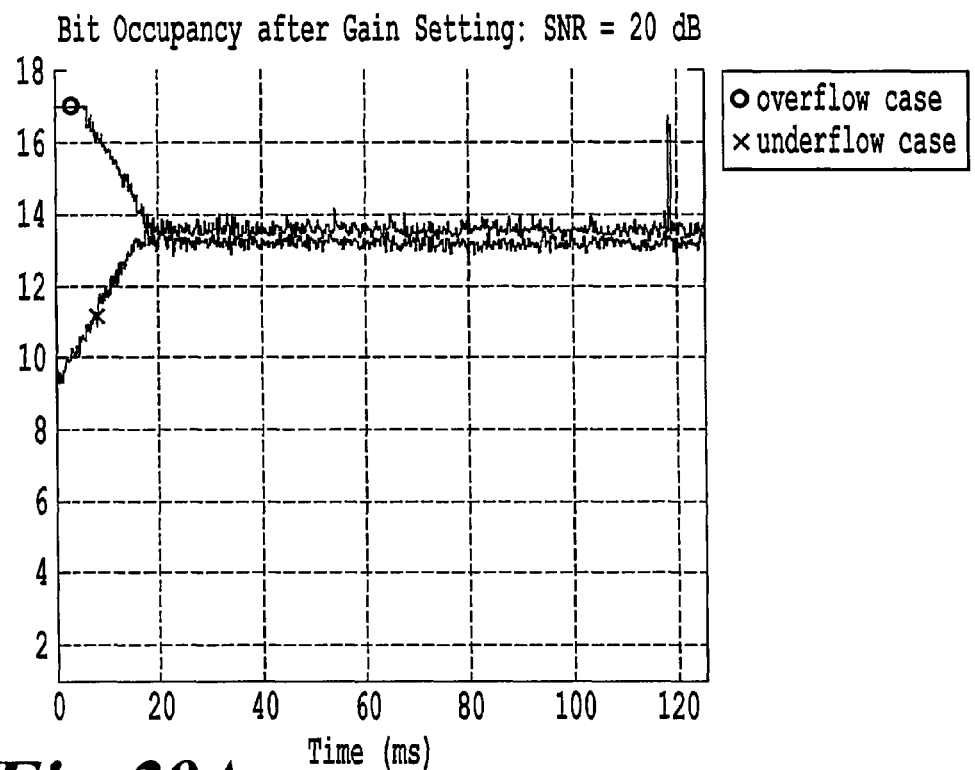
FIGS. 29A and 29B are graphs of the log 2 of the absolute value of I (or Q) of overflow and underflow input in high and low SNR case according to an exemplary embodiment.
Figure 29B:
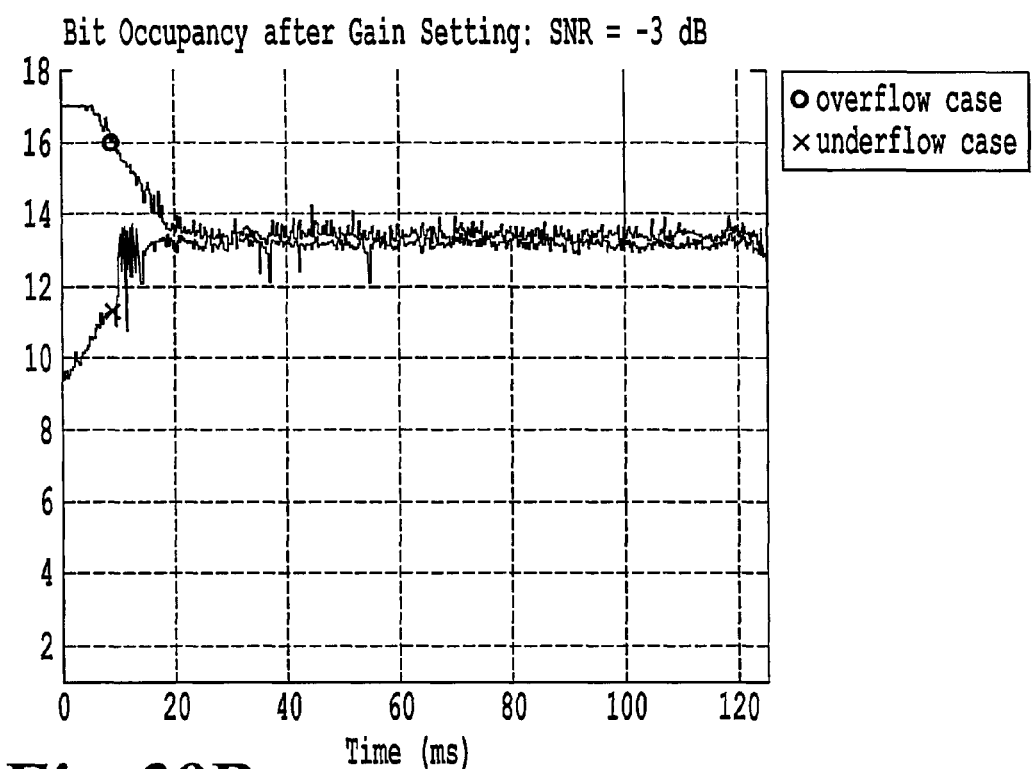

FIGS. 29A, 29B, and 30 show simulation results of four scenarios: low SNR with overflow, low SNR with underflow, high SNR with overflow, and high SNR with underflow. These four scenarios cover the possible channel signal conditions with 52 dB variation from underflow to overflow conditions. The parameters used in these four simulations are as follows:

| | |
|---|---|
| ACQ burst length | 512 symbols |
| Symbol rate | 1 Mbaud |
| SNR (low) | −3 dB, and SNR (high) = 20 dB |
| Channel signal bit-width (Nb_in) | 18 |
| Accumulator bit-width (Nb_acc) | 24 |
| Overflow/underflow bit position | bit_ovf = 14, and bit_und = 13 |
| Overflow tolerance | 5e−5 |
| Underflow tolerance | 0.99 |

FIG. 29A shows the log 2 of the absolute value of I (or Q) of overflow and underflow input in high SNR case (20 dB). Within 20 ms, the noise component of both overflow and underflow inputs converges to somewhere between 13 and 14 bits. The peak values of ACQ signal, on the other hand, are close to full scale of the data bit-width. Similar results can be seen for low SNR case in FIG. 29B except that the burst signal can hardly be seen due to low SNR of −3 dB.

FIG. 30 shows the profile of the estimated RMS for low SNR cases. The noise RMS converges to different level depending on converging direction (stepping up or stepping down). The difference of the converge levels from two directions is well within 6 dB (1 bit). The overall stepping down steps for the overflow input is 28, or 28 dB for 1 dB/step. The steps for underflow input is 22, or 22 dB for 1 dB/step. The dB values can be converted to agc gain values that can be added to the initial gain value to achieved the desired noise RMS level shown in the FIG. 30

In addition, the estimated noise RMS (RMS_noise) and the RMS of signal plus noise in ACQ period (RMS_acq, which is the maximum RMS value in the aperture time) can be used to estimate the C/N of the ACQ signal using the following formula:

$$C/N(dB) = 10 * \log 10((RMS\_acq/RMS\_noise)^2 - 1) \quad \text{Equation 32}$$

As shown in the example of FIG. 30, the one-shot C/N estimation of a short burst is reasonably accurate even at −3 dB. Furthermore, as illustrated by FIG. 30, the noise RMS value is settled at about 2 bits below the bit_ovf (=14) after the gain setting. Thus, according to an embodiment of the invention, the noise (or any continuous signal) RMS may advantageously be set at an arbitrary level by choosing a proper bit_ovf value which is not necessarily an integer.

A method of frequency-domain noise floor estimation is also described below. This method also takes the advantage of the spectral analysis FFT of the digital channelizer 102 to generate a histogram of the multicarrier signal spectral density. If a one-to-one relationship between the lowest peak of the histogram and the noise floor power spectral density is established and the latter can be estimated. Thus, an embodiment according to the invention may include a new gain setting scheme that can significantly reduce the time for remotes to acquire the network, a satellite channel condition monitor that can continuously estimate channel noise floor to detect fading profile of the channel, and C/N estimation for any active channels. Furthermore, feed-back analog gain control (AGC) is provided with much reduced gain adjustment range compared to conventionally used analog AGC schemes (which usually put ADC input 12 dB backed-off from the full scale). In other words, according to an embodiment of the invention, the AGC only needs to compensate for the variation of the noise floor at the hub receiver. Saturation of ADC is avoided by providing just enough margins for a fully occupied frequency plan in which the maximum C/N of all carriers should not exceed, for example, 30 dB.

With the initial gain setting based on frequency domain noise floor estimation method, as with the overflow/underflow based gain setting method, the key for initial gain setting of a signal is to position the noise RMS at a proper level in the signal number space such that the expected strongest signal (with max SNR) will not overflow and the weakest signal (with min SNR) and will not underflow and be buried in quantization noise.

Unlike an overflow/underflow based method where the proper noise floor is achieved by sequentially stepping up or down the channel gain through overflow and underflow detectors in a feed-back manner, the frequency domain noise floor estimation method according to an embodiment of the invention is a feed-forward approach that estimates input signal noise floor directly and then calculates the required gain to set the noise floor to a desired level. The required gain is the difference of the target noise floor and the estimated noise floor. This method is therefore a feed-forward approach with a one-shot gain adjustment.

For an exemplary initial gain setting based on frequency domain noise floor estimation method, the following assumptions are made: the gain setting is at IFFT input with the gain adjustment applied to all channels (a group of channels for wideband, multi-transponder cases), noise floor estimation is done in frequency domain at FFT output, only frequency bins that fall into passband of analog anti-aliasing filter will be used for NF estimation (about 7080% of FFT bins), the analog channel filter should be sufficiently wider than the carrier bandwidth for carrier-in-carrier applications for the noise floor to be sufficiently sampled, there might be spectral nulls that are well lower than noise floors in wideband and multi-transponder situations, the initial gain adjustment may be done only once over a short period of time (e.g., a few ms) after the start of the estimation although the noise floor estimator may run continuously, analog AGC controls signal level of ADC input so that ADC output is always 2 bits back off from full scale, the maximum C/N is 30 dB, and there will be no saturation at FFT output (this is guaranteed with Altera FFT core).

The noise floor (or signal power spectral density) in the physical world is defined as the noise power (or signal power) in unit frequency bandwidth and is usually represented in dBm/Hz. In sampled signals, the noise floor (or signal power spectral density) is calculated to achieve the same dBm/Hz number based on the ADC's impedance and gain as well as analog and digital gains of any circuitry involved. Neither the noise floor nor power spectral density must be represented in dBm/Hz in digital domain as long as the difference of digital power spectral density and digital noise floor gives a correct C/N of the signal.

Figure 31:
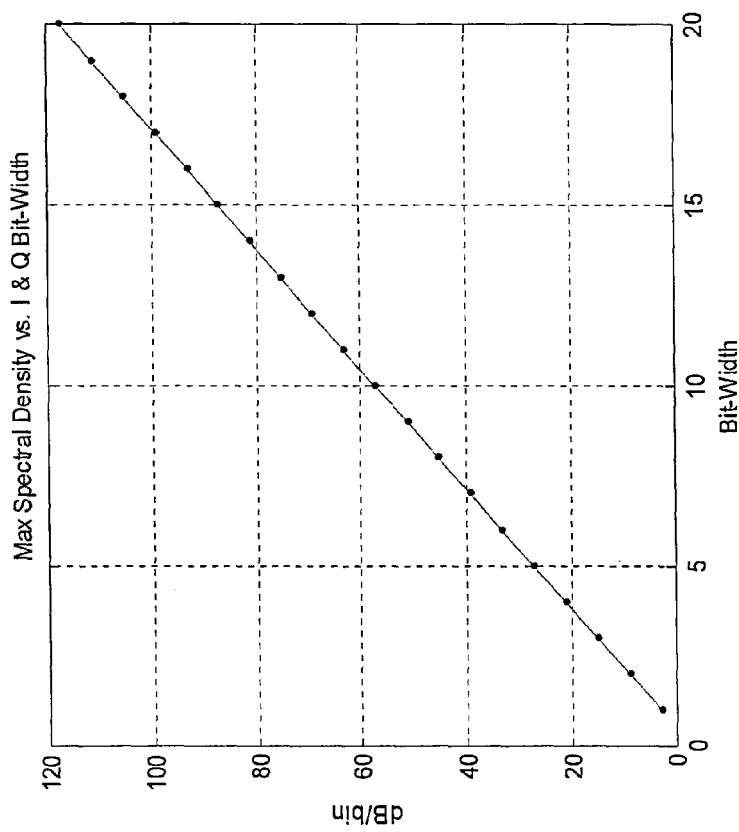
FIG. 31 is a graph of a relationship between the maximum power spectral density that can be represented with a given I & Q bit-width according to an exemplary embodiment.

Since digital samples in the frequency domain are samples of a FFT output, the noise floor or the signal power spectral density can thus be represented, for example, by the 20 log of magnitude of frequency bins in dB/bin. FIG. 31 shows a relationship between the maximum power spectral density that can be represented with a given I & Q bit-width.

Figure 32:
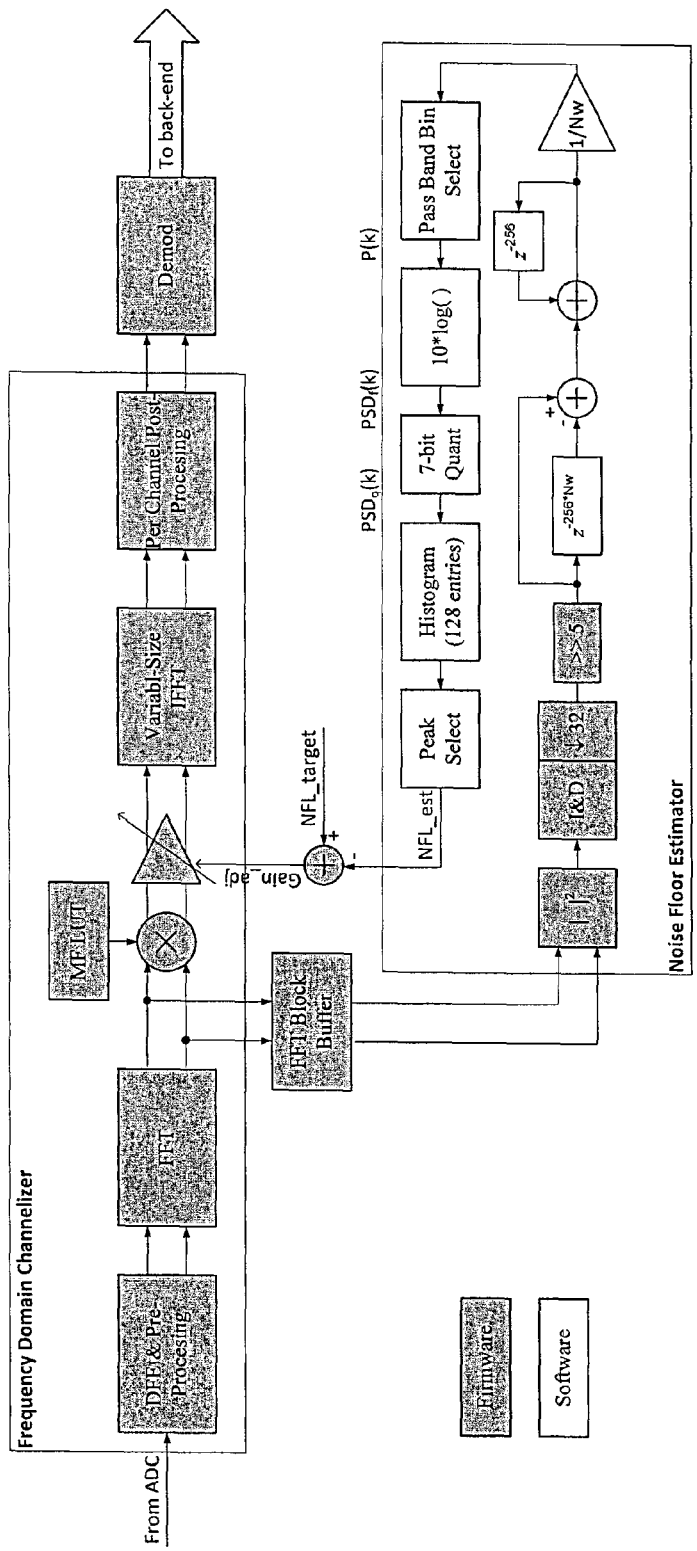
FIG. 32 is a block diagram of a frequency domain channelizer and noise floor estimator according to an exemplary embodiment.

FIG. 32 shows a block diagram of a frequency domain method according to an embodiment of the invention. The top of the block diagram is the digital channelizer 102. In a non limiting example, the noise floor estimator takes 8192 complex samples of FFT output (one FFT block) of the digital channelizer 102 at a time. It can take and process consecutive FFT blocks for firmware implementation or take a new block when calculations of previously captured block is done (i.e., until the histogram buffer is updated) for a software implementation.

To have accurate power spectrum density estimation of the multicarrier signal, several FFT blocks of data (or about a couple of milliseconds in time for contiguous blocks) may be needed. If the noise floor estimator is implemented with a software or hardware/software combination, it may take a few frames to complete the initial gain setting. To offload the computation burden for software, as shown in FIG. 32, the absolute value and Integrate and Dump (I&D) decimation functions can be implemented in firmware which will reduce 8192 complex samples to only 256 real samples for each FFT block. Each of the 256 samples is actually the average power over 32 FFT bins of the current FFT block. So they represent the spectral density in dB/bin, where the bin bandwidth is (47000/8192)*32=183.6 KHz.

The block that follows the I&D is a moving average that generates 256 average bin powers of the last Nw (e.g., 15) captured FFT blocks. Of the 256 bins, only those in the passband of the analog anti-aliasing filter will be retained for power spectral density calculation and histogram accumulation. Assuming the passband is about 80% of the sampled bandwidth, 10% (or 26 bins) on both edges of the 256-bin moving average output should be discarded.

The remaining 204 bin power values are then converted to power spectral density in dB/bin by taking 10 log to the power values (P(k), k=1, 2, . . . , 204) using the following equation:

$$PSD_f(k) = 10\log_{10}(P(k)) \left(\frac{dB}{bin}\right) \qquad \text{Equation 33}$$

The floating point power spectral density values are then quantized to 7 bits numbers before histogram accumulations. The quantization is performed using the following equation:

$$PSD_q(k) = \text{round}\left(PSD_f(k) \frac{2^7}{PSD_{max}}\right) \qquad \text{Equation 34}$$

where $PSD_{max}$ is the maximum power spectral density for a given FFT output bit-width (see FIG. 31) and computed using the following equation:

$$PSD_{max} = 10 \log_{10}(2^{(2(Nbfft-1)+1)})(dB) \qquad \text{Equation 35}$$

The 7-bit addressed power spectral density histogram is then generated and can be used to identify the strongest and the weakest signals in terms of spectral density. In this example, the weakest 'signal' is noise. Therefore, the noise floor estimation becomes a problem of finding out the first peak (a local maximum) of the power spectral density histogram.

Figure 33A:
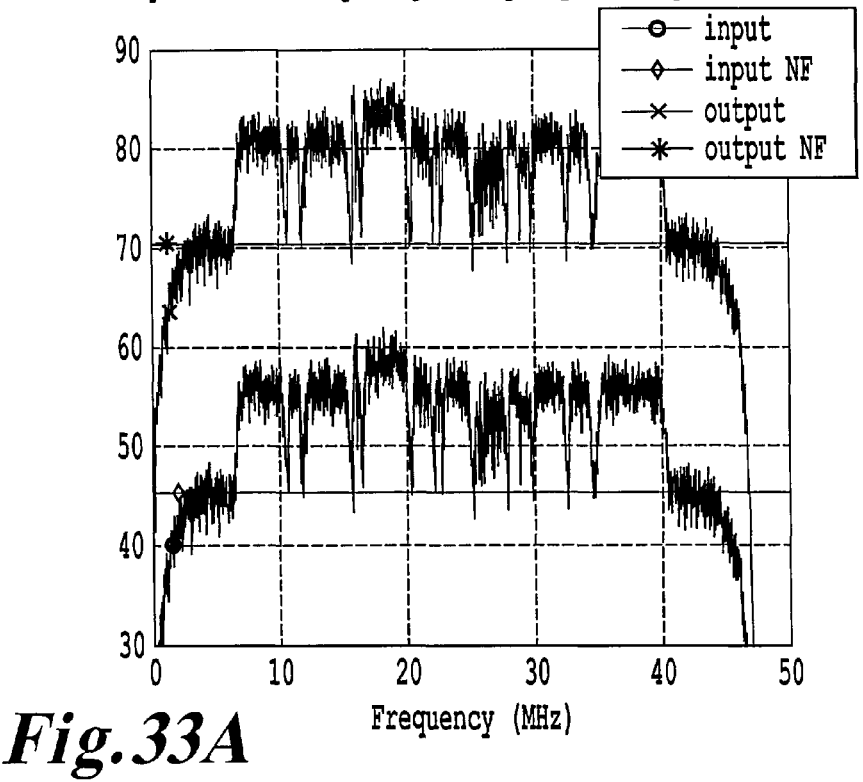
FIGS. 33A and 33B are graphs of simulation results of frequency domain initial gain setting method for a high occupancy case according to an exemplary embodiment.
Figure 33B:
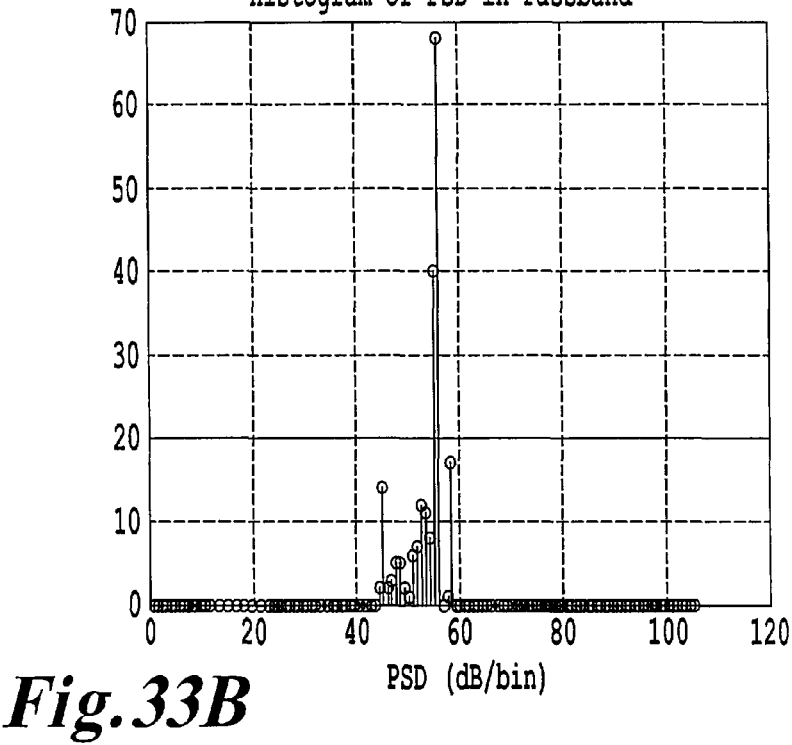

FIG. 33A shows an exemplary power spectral density and FIG. 33B shows the corresponding power spectral density histogram. To get the actual noise floor power spectral density estimation, the index of lowest local maximum of the power spectral density histogram $ind_{NL}$ can be determined followed by converting the index to the noise floor power spectral density using the following equation:

$$NFL_{est} = ind_{NF} \frac{PSD_{max}}{2^7} \left(\frac{dB}{bin}\right) \qquad \text{Equation 36}$$

A more robust criteria on noise floor index selection can be added by also checking the bin count at the index as well as comparing the distance between the lowest and highest local maxima with the expected maximum C/N. If the distance, which should represent the maximum C/N, is higher than the expected maximum C/N of the system, the lowest local maximum is a false power spectral density of the noise floor (e.g., a notch by a band-stop filter or due to incorrect inclusion of FFT bins corresponding to the skirt or stop-band of the anti-aliasing filter). Then the second lowest local maximum becomes the most probable noise floor candidate.

Finally, the amount of gain adjustment to bring the noise floor to the desired target level is the difference of the target level and the estimated noise floor as shown in the following equation:

$$\text{Gain}_{adj} = NFL_{target} - NFL_{est}(dB) \qquad \text{Equation 37}$$

where $NFL_{target}$ is the maximum power spectral density (PSDmax) backed off by BO dB as shown in the following equation:

$$NFL_{target} = PSD_{max} - BO \left(\frac{dB}{bin}\right) \qquad \text{Equation 38}$$

Figure 34A:
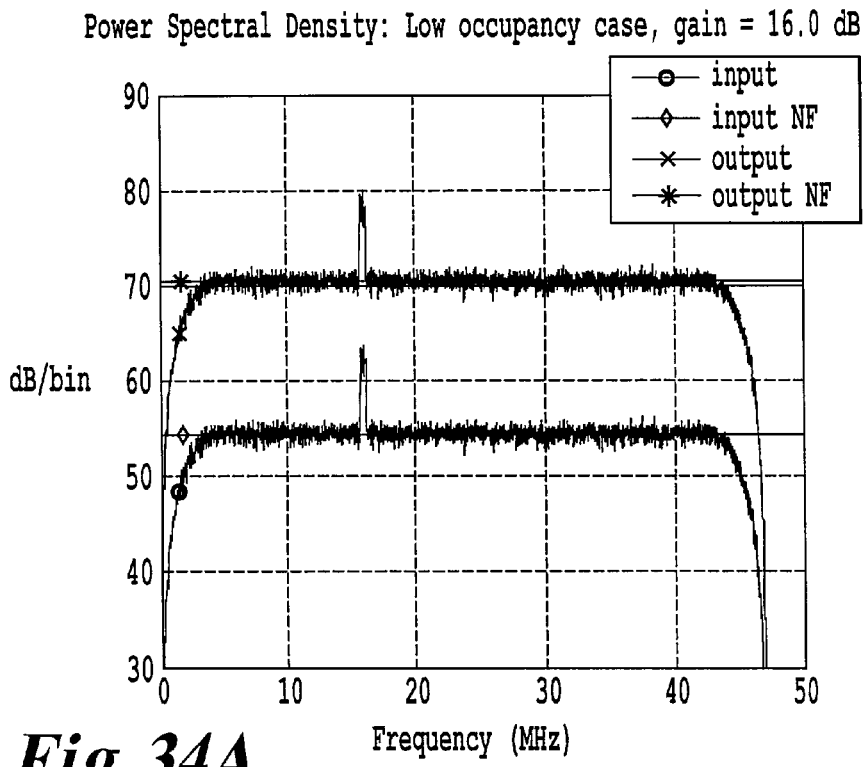
FIGS. 34A and 34B are graphs of simulation results of a frequency domain initial gain setting method for a low occupancy case according to an exemplary embodiment.
Figure 34B:
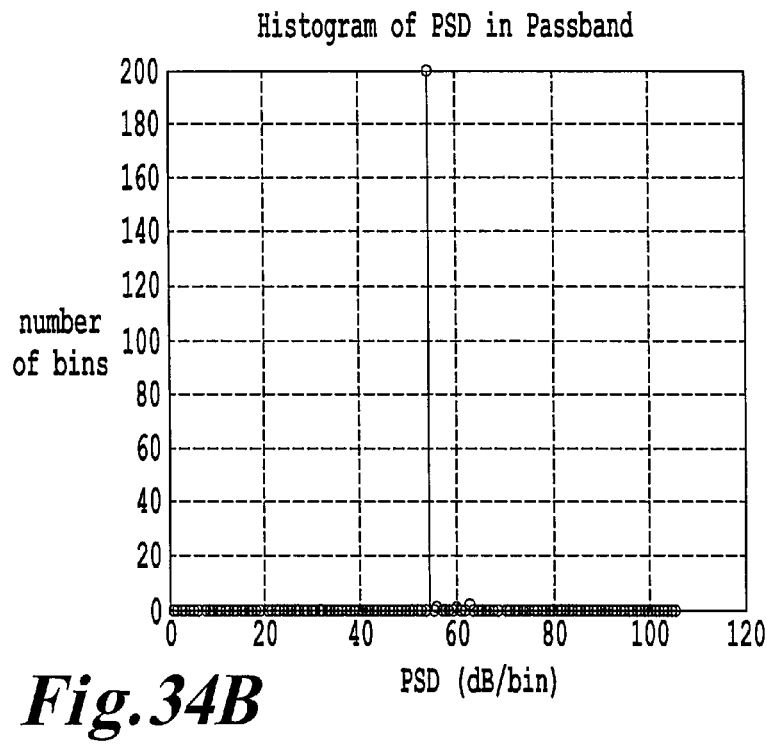

FIGS. 33A, 33B, 34A, and 34B illustrate simulation results of a frequency domain initial gain setting method according to an embodiment of the invention. FIGS. 33A and 33B illustrate an example for a high occupancy case (case 1) where about 73% of the 47 MHz is populated with tightly packed carriers. FIGS. 34A and 34B illustrate an example for a low occupancy case (case 2) where only a single 470 Kbaud carrier is present in the 47 MHz bandwidth. The parameters used in these simulations are

| | |
|---|---|
| FFT size | 8192. |
| FFT sampling frequency | 47 MHz. |
| Estimation sample size | 9 FFT blocks for case 1 |
| | 43 FFT blocks for case 2. |
| FFT input bit-width | 12, FFT output bit-width = 18; |
| FFT input back-off from full scale | 12 dB. |
| Target noise floor back-off (BO) | 35 dB. |

Plots of these two examples show that the noise floor after the initial gain setting settles at the expected 70 dB/bin level (=105−BO) regardless of multicarrier occupancy.

The frequency domain method according to an embodiment of the invention, may be more complex than the conventional overflow/underflow based time domain method because of FFT and log computations. The increased complexity is less significant in the digital channelizer 12 because FFT output is readily available. As suggested in FIG. 32, the noise floor estimator may be implemented in software for longer gain setting time (several frames, for instance). This method has no hard limitation and should work for any multicarrier occupancy (as long as carriers are non-overlapping). In the worst case where multicarrier occupancy is 80% or higher, which renders fewer bins at the noise floor (i.e., only those at notches between carriers), the noise floor estimate may be biased by a few dB (usually higher). This nevertheless might not be an issue as long as the target noise floor is sufficiently backed off.

The overflow/underflow based method can be used in various application including, but not limited by, moving-average RMS estimation (for channel activity detection), automatic overflow detection and filtering (to avoid saturation), channel C/N estimation. The frequency domain method can be used in various application including, but not limited by, satellite channel condition monitor (continuously estimate channel noise floor to detect fading profile of the channel) and C/N estimation for the strongest carrier.

Next, a hardware description of the MCD 11 according to exemplary embodiments is described with reference to FIG.

Figure 35:
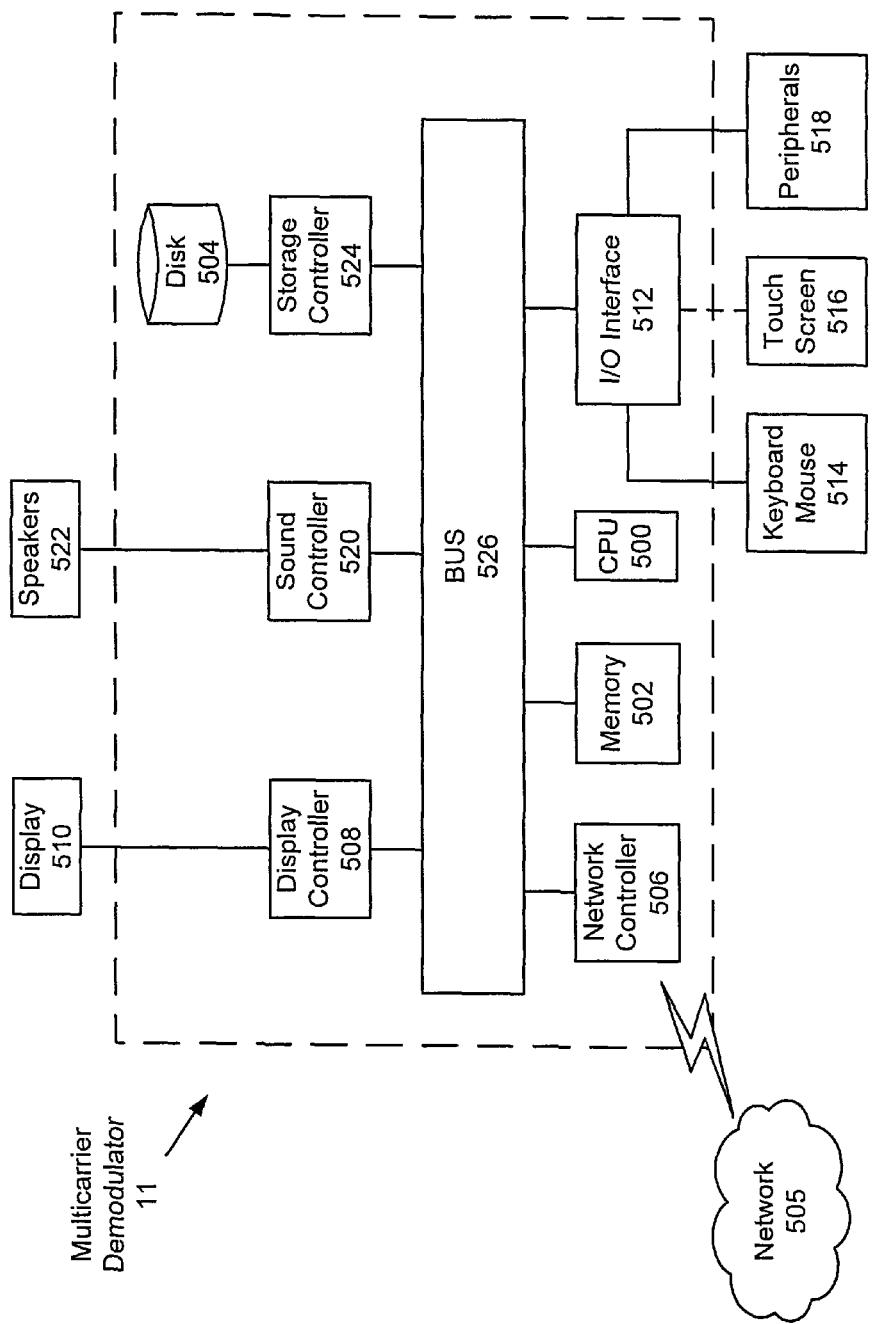
FIG. 35 is a hardware block diagram of a multi-channel demodulator apparatus according to an exemplary embodiment.

35. In FIG. 35, the MCD 11 includes a CPU 500 which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the MCD 11 communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The MCD 11 in FIG. 35 also includes a network controller 506, such as an Intel Ethernet PRO network interface card from Intel Corporation of America, for interfacing with network 505. As can be appreciated, the network 505 can be a public network, such as the Internet, or a private network such as an LAN or WAN network, or any combination thereof and can also include PSTN or ISDN sub-networks. The network 505 can also be wired, such as an Ethernet network, or can be wireless such as a cellular network including EDGE, 3G and 4G wireless cellular systems. The wireless network can also be WiFi, Bluetooth, or any other wireless form of communication that is known.

The MCD 11 further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the MCD 11, such as Sound Blaster X-Fi Titanium from Creative, to interface with speakers/microphone 522 thereby providing sounds and/or music. The speakers/microphone 522 can also be used to accept dictated words as commands for controlling the MCD 11 or for providing location and/or property information with respect to the target property.

The general purpose storage controller 524 connects the storage medium disk 504 with communication bus 526, which may be an ISA, EISA, VESA, PCI, or similar, for interconnecting all of the components of the MCD 11. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method of decoding a Time Division Multiple Access (TDMA) digitally encoded signal having plural channels and at least one channel in the plural channels having a different symbol rate than other channels in the plural channels, the method comprising:
   generating, from the digitally encoded signal by a frequency domain channelizer, a sequence of overlapped Fast Fourier Transform (FFT) blocks each produced by an overlap-add or overlap-save convolution of a received analog signal;
   generating one channel data block for each of the plural channels from each overlapped FFT block, a size of each channel data block depending, in part, on the symbol rate of the corresponding channel, and a number of samples per symbol of the corresponding channel;
   storing each of the plural channel data blocks in a corresponding independent channel buffer of a burst reconstruction buffer, the burst reconstruction buffer including an independent channel buffer for each of the plural channels and a counter for each of the independent channel buffers, each counter counting a number of samples that are currently stored in a corresponding independent channel buffer;
   selecting one of the independent channel buffers when a counted number of samples by the corresponding counter exceeds a value that corresponds to a length of a complete TDMA burst for the corresponding channel;
   outputting, as a complete TDMA burst, the plurality of channel data blocks from the selected one of the independent channel buffers to a TDMA demodulator; and
   demodulating the complete TDMA burst of the digitally encoded signal at the TDMA demodulator from the plurality of channel data blocks outputted from the selected one of the independent channel buffers.

2. The method according to claim 1, further comprising:
   generating a process request signal for the selected independent channel buffer when the count of the corresponding counter exceeds the value that corresponds to the length of the complete TDMA burst for the corresponding channel;
   sending the process request signal to a process request queue; and
   selecting the one of the independent channel buffers based on the process request signal in the process request queue.

3. The method according to claim 2, further comprising:
   receiving the process request signal from each of the plurality of respective independent channel buffers;
   storing the plurality of process request signals in a queue; and
   selecting one of the plurality of independent channel buffers based on a status of the queue.

4. The method according to claim 2, wherein the generating the process request signal for the independent channel buffer further comprises generating the process request signal based on a fullness of the independent channel buffer.

5. The method according to claim 2, further comprising:
determining a depth of the channel buffer to accommodate coexistence of a highest and lowest symbol rate and a longest and shortest TMDA burst coexist.

6. The method according to claim 5, further comprising:
generating an over-run flag when the count of a counter in any channel buffer exceeds the depth of the corresponding channel buffer.

7. A digital signal decoding apparatus for decoding a Time Division Multiple Access (TDMA) digitally encoded signal having plural channels and at least one channel in the plural channels having a different symbol rate than other channels in the plural channels, the apparatus comprising:
a frequency domain channelizer configured to generate from the digitally encoded signal a sequence of overlapped Fast Fourier Transform (FFT) blocks each produced by an overlap-add or overlap-save convolution of a received analog signal, and to generate one channel data block for each of the plural channels from each overlapped FFT block, a size of each channel data block depending, in part, on the symbol rate of the corresponding channel, and a number of samples per symbol of the corresponding channel;
a burst reconstruction buffer configured to store each of the plural channel data blocks in a corresponding independent channel buffer of the burst reconstruction buffer, the burst reconstruction buffer including an independent channel buffer for each of the plural channels and a counter for each of the independent channel buffers, each counter counting a number of samples that are currently stored in a corresponding independent channel buffer;
a selector configured to select one of the independent channel buffers when a counted number of samples by the corresponding counter exceeds a value that corresponds to a length of a complete TDMA burst for the corresponding channel;
the burst reconstruction buffer is further configured to output, as a complete TDMA burst, the plurality of channel data blocks from the selected one of the independent channel buffers; and
a TDMA demodulator configured to demodulate the complete TDMA burst of the digitally encoded signal from the plurality of channel data blocks outputted from the selected one of the independent channel buffers.

8. The apparatus of claim 7, wherein:
the burst reconstruction buffer is further configured to send a process request signal to a process request queue for a channel buffer when the count of the corresponding counter exceeds the value that corresponds to the length of the complete TDMA burst for the corresponding channel, and to select the one of the independent channel buffers based on the process request signal in the process request queue.

9. The apparatus of claim 7, wherein the burst reconstruction buffer is further configured to determine a depth of the channel buffer to accommodate coexistence of a highest and lowest symbol rate and a longest and shortest TDMA burst.

10. The apparatus of claim 8, further comprising:
a process queuing device configured to receive the process request signal from each of the plurality of respective independent channel buffers, store the plurality of process request signals in a queue, and select one of the plurality of independent channel buffers based on the status of the queue.

11. The apparatus of claim 8, wherein the burst reconstruction buffer is further configured to generate the process request signal based on a fullness of the independent channel buffer.

12. The apparatus of claim 8, wherein the burst reconstruction buffer is further configured to generate an over-run flag when the the count of a counter in any channel buffer exceeds the depth of the corresponding channel buffer.

13. A digital signal decoding apparatus for decoding a Time Division Multiple Access (TDMA) digitally encoded signal having plural channels and at least one channel in the plural channels having a different symbol rate than other channels in the plural channels, the apparatus comprising:
means for generating from the digitally encoded signal a sequence of overlapped Fast Fourier Transform (FFT) blocks each produced by an overlap-add or overlap-save convolution of a received analog signal, and for generating one channel data block for each of the plural channels from each overlapped FFT block, a size of each channel data block depending, in part, on the symbol rate of the corresponding channel, and a number of samples per symbol of the corresponding channel;
means for storing each of the plural channel data blocks in a corresponding independent channel buffer of the means for storing, the means for storing including an independent channel buffer for each of the plural channels and a counter for each of the independent channel buffers, each counter counting a number of samples that are currently stored in a corresponding independent channel buffer;
a selector configured to select one of the independent channel buffers when a counted number of samples by the corresponding counter exceeds a value that corresponds to a length of a complete TDMA burst for the corresponding channel;
means for outputting, as a complete TDMA burst, the plurality of channel data blocks from the selected one of the independent channel buffers; and
a TDMA demodulator configured to demodulate the complete TDMA burst of the digitally encoded signal from the plurality of channel data blocks outputted from the selected one of the independent channel buffers.

14. A non-transitory computer-readable storage medium having a computer-readable program stored therein that when executed by a computer causes the computer to perform a method of decoding a Time Division Multiple Access (TDMA) digitally encoded signal having plural channels and at least one channel in the plural channels having a different symbol rate than other channels in the plural channels, the method comprising:
generating, from the digitally encoded signal by a frequency domain channelizer, a sequence of overlapped Fast Fourier Transform (FFT) blocks each produced by an overlap-add or overlap-save convolution of a received analog signal;
generating one channel data block for each of the plural channels from each overlapped FFT block, a size of each channel data block depending, in part, on the symbol rate of the corresponding channel, and a number of samples per symbol of the corresponding channel;
storing each of the plural channel data blocks in a corresponding independent channel buffer of a burst reconstruction buffer, the burst reconstruction buffer including an independent channel buffer for each of the plural channels and a counter for each of the independent channel buffers, each counter counting a number of samples that are currently stored in a corresponding independent channel buffer;

selecting one of the independent channel buffers when a counted number of samples by the corresponding counter exceeds a value that corresponds to a length of a complete TDMA burst for the corresponding channel;

outputting, as a complete TDMA burst, the plurality of channel data blocks from the selected one of the independent channel buffers to a TDMA demodulator; and demodulating the complete TDMA burst of the digitally encoded signal at the TDMA demodulator from the plurality of channel data blocks outputted from the selected one of the independent channel buffers.

* * * * *